US010750814B2

(12) United States Patent
Holmes et al.

(10) Patent No.: US 10,750,814 B2
(45) Date of Patent: Aug. 25, 2020

(54) METHOD AND DEVICE FOR THE MANUFACTURE OF SPORTING GOODS AND SPORTING GOODS MANUFACTURED THEREBY

(71) Applicant: adidas AG, Herzogenaurach (DE)

(72) Inventors: Christopher Edward Holmes, Herzogenaurach (DE); Jan Hill, Herzogenaurach (DE); Clemens Paul Dyckmans, Herzogenaurach (DE); Giridharan Kirupanantham, Herzogenaurach (DE); Gerd Rainer Manz, Herzogenaurach (DE); Dietmar Klaus Drummer, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 322 days.

(21) Appl. No.: 15/016,073

(22) Filed: Feb. 4, 2016

(65) Prior Publication Data
US 2016/0262489 A1 Sep. 15, 2016

(30) Foreign Application Priority Data

Feb. 5, 2015 (DE) .................. 10 2015 202 014
Jan. 18, 2016 (EP) .................... 16151729

(51) Int. Cl.
A43B 9/12 (2006.01)
A43B 5/00 (2006.01)
(Continued)

(52) U.S. Cl.
CPC .............. A43B 9/12 (2013.01); A43B 5/00 (2013.01); A43B 9/20 (2013.01); B29C 65/1412 (2013.01);
(Continued)

(58) Field of Classification Search
CPC .... A43B 9/12; A43B 5/00; A43B 9/20; A43B 9/00; B29C 65/1412
(Continued)

(56) References Cited

U.S. PATENT DOCUMENTS 5,522,954 A  6/1996 Bennett et al.
6,432,320 B1  8/2002 Bonsignore et al.
(Continued)

FOREIGN PATENT DOCUMENTS

AT    505333    12/2008
CN    1087573   6/1994
(Continued)

OTHER PUBLICATIONS

Chinese Application No. 201610080826.2, Office Action dated Aug. 30, 2017, 14 pages (7 pages of the original document and 7 pages of the English translation).
(Continued)

Primary Examiner — Alissa L Hoey
Assistant Examiner — Catherine M Ferreira
(74) Attorney, Agent, or Firm — Kilpatrick Townsend & Stockton LLP

(57) ABSTRACT

Described are methods for the manufacture of sporting goods, in particular a shoe, sporting goods manufactured by such methods, for example a shoe, as well as a device for performing such methods. The method for the manufacture of sporting goods, in particular a shoe, is provided, wherein the sporting goods has a first component with a first connection surface and a second component with a second connection surface. The method includes activating at least one portion of the first connection surface by providing heat energy without contact, and connecting the first component with the second component by joining the first connection surface and the second connection surface.

19 Claims, 9 Drawing Sheets

(51) Int. Cl.
  *B29C 65/14* (2006.01)
  *A43B 9/20* (2006.01)
  *B29C 65/16* (2006.01)
  *B29C 65/00* (2006.01)
  *B29C 65/82* (2006.01)
  *B29C 65/48* (2006.01)
  *B29C 65/20* (2006.01)
  *B29L 31/50* (2006.01)

(52) U.S. Cl.
  CPC ...... *B29C 65/1425* (2013.01); *B29C 65/1432* (2013.01); *B29C 65/1496* (2013.01); *B29C 65/1632* (2013.01); *B29C 66/1122* (2013.01); *B29C 66/54* (2013.01); *B29C 66/729* (2013.01); *B29C 66/7294* (2013.01); *B29C 66/7392* (2013.01); *B29C 66/83221* (2013.01); *B29C 66/83241* (2013.01); *B29C 66/91935* (2013.01); *B29C 66/92655* (2013.01); *B29C 65/1467* (2013.01); *B29C 65/1667* (2013.01); *B29C 65/20* (2013.01); *B29C 65/2023* (2013.01); *B29C 65/48* (2013.01); *B29C 65/8223* (2013.01); *B29C 66/71* (2013.01); *B29C 66/73116* (2013.01); *B29L 2031/50* (2013.01); *B32B 2437/02* (2013.01)

(58) Field of Classification Search
  USPC ............................................................ 36/83
  See application file for complete search history.

(56) References Cited

U.S. PATENT DOCUMENTS

| | | | |
|---|---|---|---|
| 7,992,243 | B2 | 8/2011 | Cook et al. |
| 8,302,649 | B2 | 11/2012 | Böl |
| 8,747,584 | B2 * | 6/2014 | Knapp ................ B29C 65/1412 156/64 |
| 9,027,623 | B2 | 5/2015 | Schip |
| 2007/0033750 | A1 | 2/2007 | Cook et al. |
| 2010/0181026 | A1 | 7/2010 | Bol |
| 2011/0265241 | A1 * | 11/2011 | Shiue ................... A41D 13/012 2/69 |
| 2012/0272899 | A1 | 11/2012 | Makover et al. |
| 2013/0255103 | A1 * | 10/2013 | Dua ........................ A43B 1/04 36/87 |
| 2014/0000043 | A1 | 1/2014 | Boardman et al. |
| 2014/0000044 | A1 | 1/2014 | Boardman et al. |
| 2014/0223673 | A1 | 8/2014 | Wardlaw et al. |
| 2014/0243442 | A1 | 8/2014 | Coles et al. |
| 2014/0275306 | A1 | 9/2014 | Watkins et al. |

FOREIGN PATENT DOCUMENTS

| | | |
|---|---|---|
| CN | 103978620 | 8/2014 |
| CN | 104334043 | 2/2015 |
| DE | 1914537 | 4/1965 |
| DE | 3437786 | 4/1986 |
| DE | 19633467 | 2/1998 |
| DE | 19648804 | 5/1998 |
| DE | 19654860 | 5/1998 |
| DE | 19754834 | 6/1999 |
| DE | 19860611 | 3/2000 |
| DE | 69811251 | 1/2004 |
| DE | 102004049060 | 6/2005 |
| DE | 102011108744 | 1/2013 |
| DE | 102012206094 | 10/2013 |
| DE | 102013012515 | 3/2014 |
| DE | 102013002519 | 8/2014 |
| EP | 1016354 | 7/2000 |
| EP | 922559 | 3/2005 |
| EP | 1990170 | 11/2008 |
| EP | 2202051 | 6/2010 |
| EP | 2764972 | 8/2014 |
| EP | 2862467 | 4/2015 |
| EP | 2865289 | 4/2015 |
| FR | 1207226 | 2/1960 |
| JP | 51112882 | 10/1976 |
| JP | 52136054 | 11/1977 |
| JP | 2000190394 | 7/2000 |
| JP | 2012517535 | 8/2012 |
| JP | 2014158708 | 9/2014 |
| JP | 2014531352 | 11/2014 |
| WO | 9956578 | 11/1999 |
| WO | 2012099784 | 7/2012 |
| WO | 2014150122 | 9/2014 |

OTHER PUBLICATIONS

U.S. Appl. No. 15/016,095, filed Feb. 4, 2016, Le et al.
German Patent Application No. 102015202014.2, First Office Action dated Dec. 16, 2015, 5 pages (No English translation available. A summary of the Office Action is provided in the Transmittal Letter submitted herewith).
European Application No. 16151729.7, Extended European Search Report dated Jun. 22, 2016, 7 pages.
Chinese Patent Application No. 201610080826.2, Office Action dated Apr. 18, 2018, 8 pages (No English translation available. A summary of the Office Action is provided in the Transmittal Letter submitted herewith).
Japanese Application No. 2016-015405, Office Action dated Aug. 21, 2018, 11 pages (6 pages of the original document and 5 pages of the English translation).
Chinese Patent Application No. 201610080826.2, Third Office Action dated Aug. 10, 2018, 14 pages (8 pages of English translation and 6 pages of original document).
Japanese Patent Application No. 2016-015405, Second Office Action dated Dec. 11, 2018, 13 pages (6 pages of English translation and 7 pages of original document).
German Patent Application No. DE 102015202014.2, Third Office Action dated Sep. 2, 2019, 9 pages (6 pages of English translation and 4 pages of original document).
German Patent Application No. DE 102015202014.2 , Second Office Action dated Jun. 4, 2018, 12 pages (7 pages of English translation and 5 pages of original document).
European Patent Application No. 16151729.7, Office Action dated Nov. 6, 2019, 3 pages.

* cited by examiner

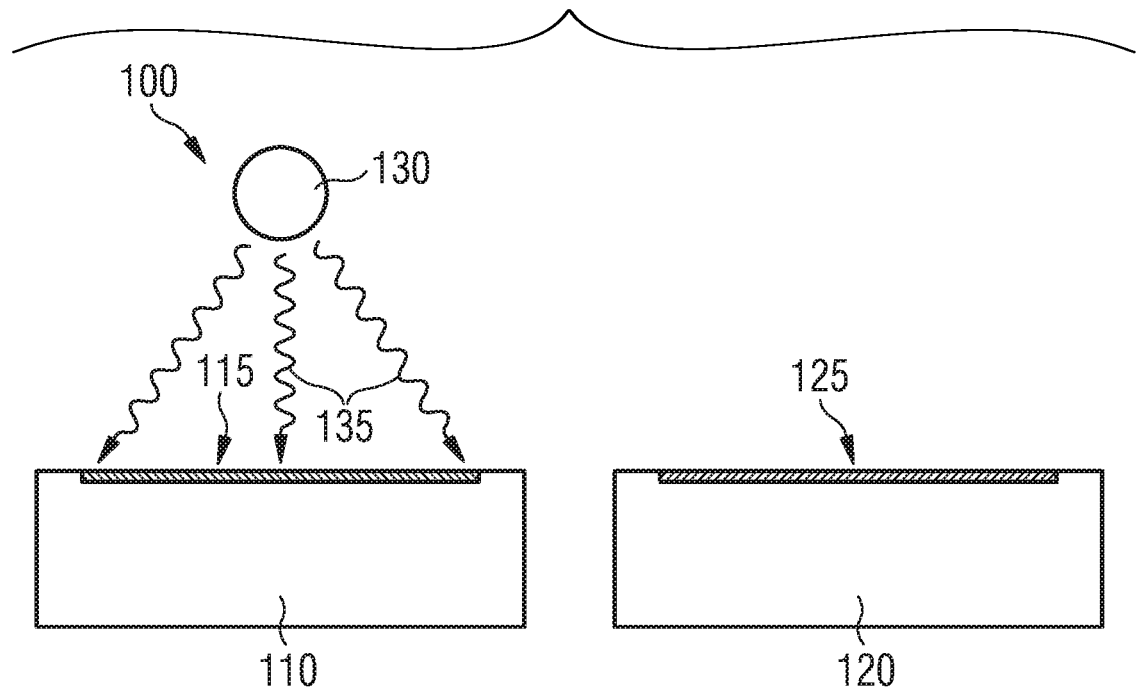
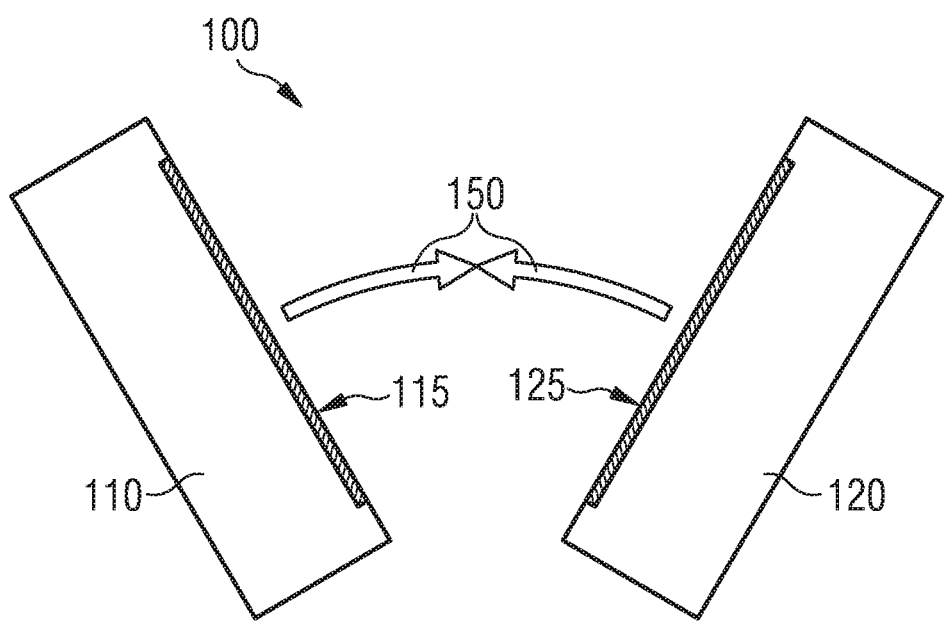

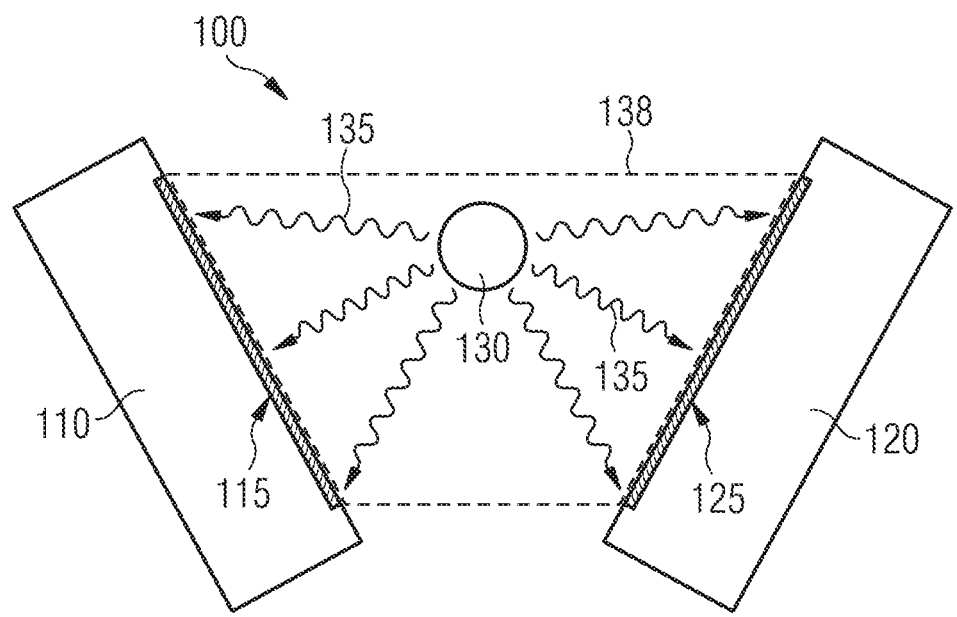
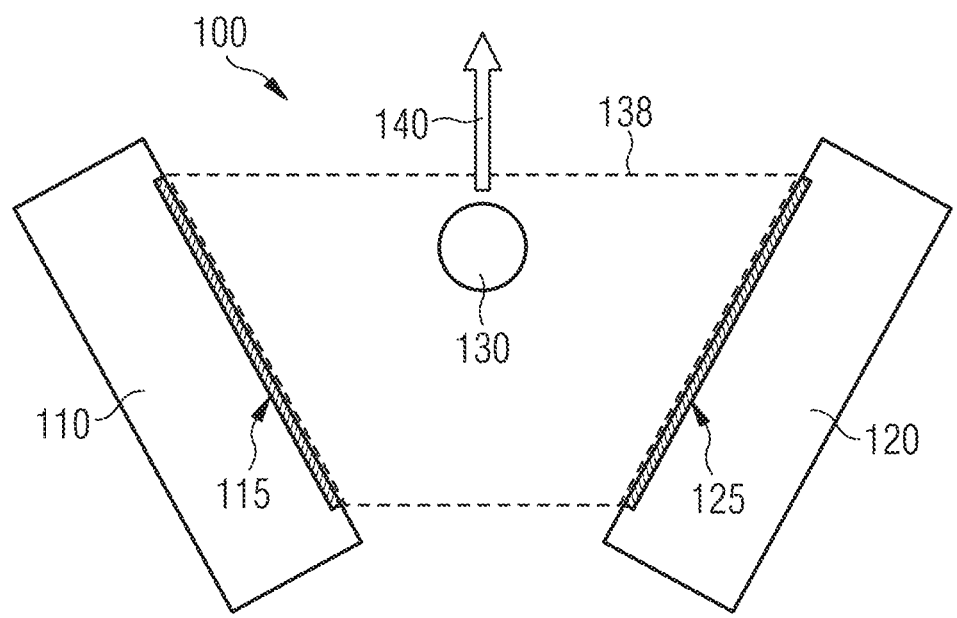

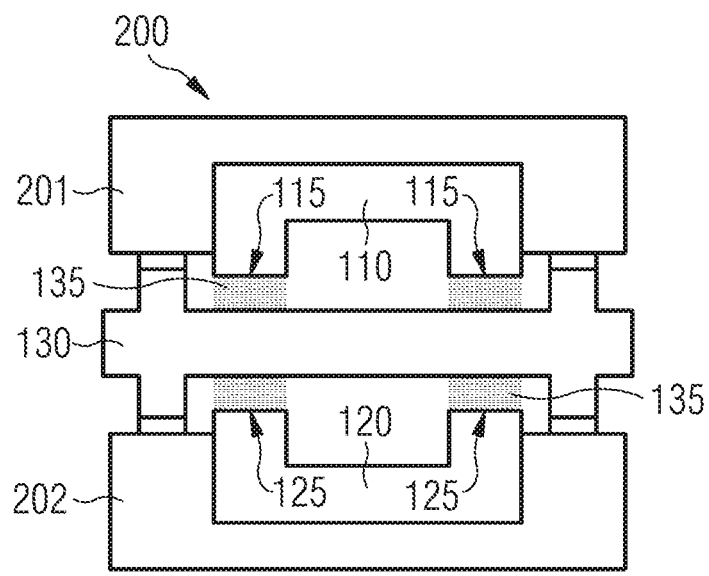
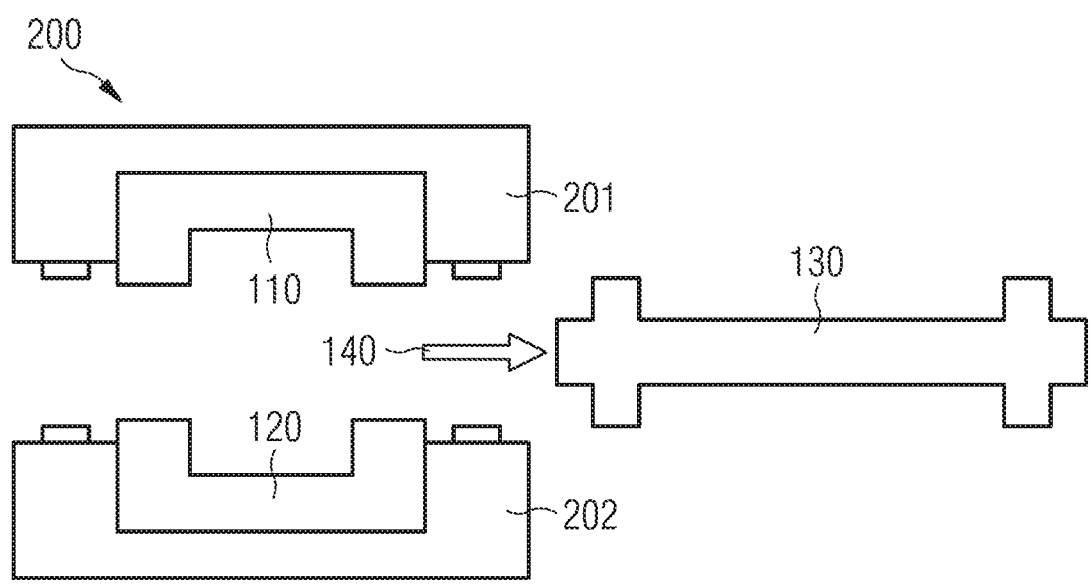

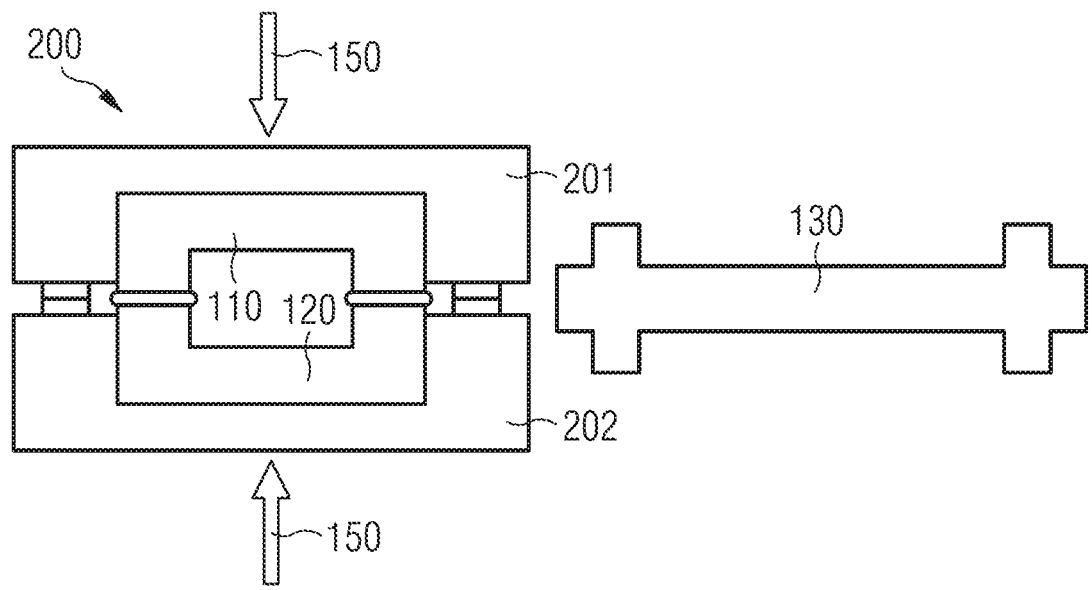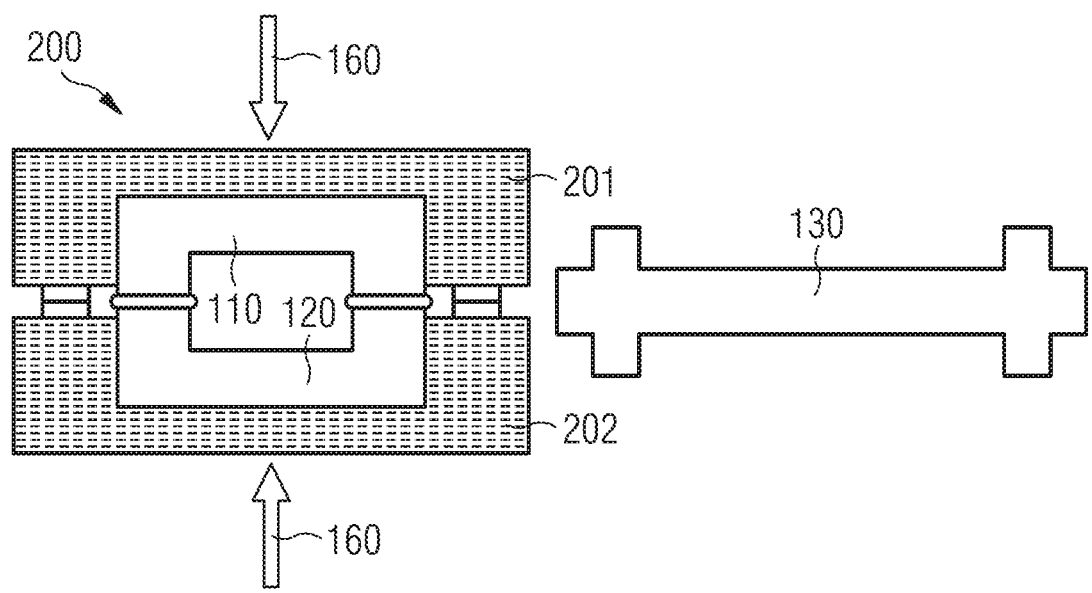

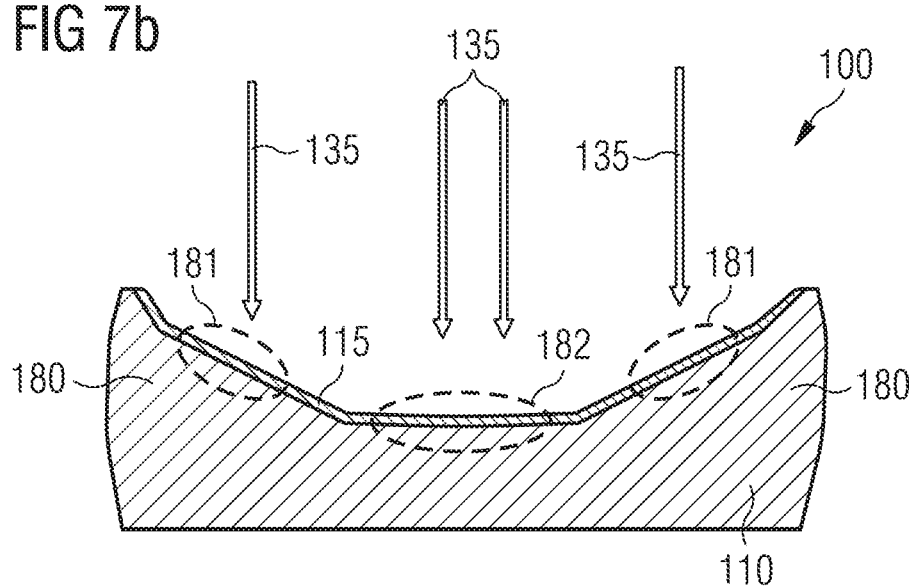
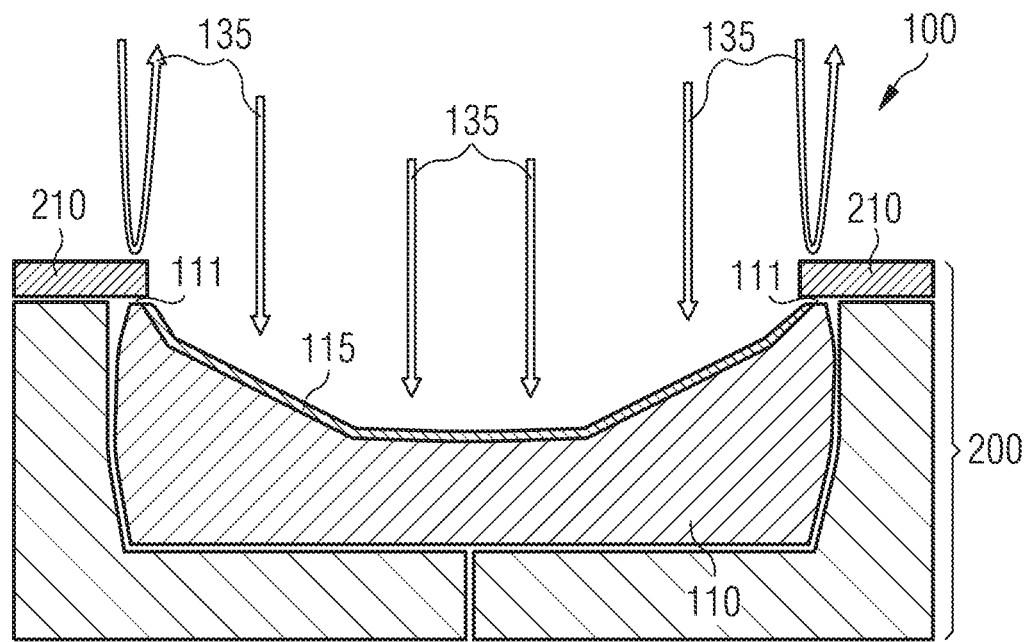

METHOD AND DEVICE FOR THE MANUFACTURE OF SPORTING GOODS AND SPORTING GOODS MANUFACTURED THEREBY

CROSS REFERENCE TO RELATED APPLICATION

This application is related to and claims priority benefits from German Patent Application No. DE 10 2015 202 014.2, filed on Feb. 5, 2015, entitled METHOD AND DEVICE FOR THE MANUFACTURE OF SPORTING GOODS AND SPORTING GOOD MANUFACTURED THEREBY ("the '014 application"), and is related to and claims priority benefits from European Patent Application No. EP 16 151 729.7, filed on Jan. 18, 2016, entitled METHOD AND DEVICE FOR THE MANUFACTURE OF SPORTING GOODS AND SPORTING GOOD MANUFACTURED THEREBY ("the '729 application"). The '014 and '729 applications are hereby incorporated herein in their entireties by this reference.

FIELD OF THE INVENTION

The present invention relates to a method for the manufacture of sporting goods, in particular a shoe, sporting goods manufactured by such method, for example a shoe, as well as a device for performing such method.

BACKGROUND

In manufacturing sporting goods, for example shoes or sports clothing, it is often necessary to permanently connect individual components together. Such components of sporting goods frequently comprise plastic materials. This must be taken into consideration when selecting a suitable method for connecting the components.

One option is to connect the components mechanically, for example by screwing or riveting the components. However, this may be disadvantageous, for example with respect to the look of the sporting goods, their weight or the durability or resilience of the connection.

A further possibility is to glue the components together. This option may have the disadvantage, for example, that gluing may require complex pretreatment of the components. It may, for example, be necessary, particularly in the case of plastic components, to first roughen and prime the surfaces of the components and to pre-dry the adhesive used for connecting the components in an oven. In addition, adhesives used for the gluing of plastic components are often harmful or environmentally hazardous.

In particular for connecting plastic components, various welding options have been used, for example using heat energy.

WO 99/56578 A1 relates to a machine for stretching shoe uppers and for attaching them to corresponding soles. US 2012/0272899 A1 relates to a system for applying hot melt adhesive powder onto a non-metallic object surface. DE 1 914 537 A relates to a method for gluing shoe shafts with soles with a heat-activatable glue. DE 698 11 251 T2 relates to a shock absorbing component and its manufacture. U.S. Pat. No. 7,992,243 B2 relates to a custom fit system with adjustable last and a method for custom fitting athletic shoes. U.S. Pat. No. 5,522,954 relates to non-contact bonding of plastics. U.S. Pat. No. 9,027,623 B2 relates to a welding apparatus for conveyor belts and method. U.S. Pat. No. 8,747,584 B2 relates to a flashless welding method and apparatus. U.S. Pat. No. 8,302,649 B2 relates to an infrared welding device. EP 0 922 559 B1 relates to a process for joining components.

US 2007/0033750 A1 describes a system for custom fitting athletic shoes to a wearer. Shoes of a single width for each shoe length have at least a portion of the upper made of a heat malleable material to be custom fitted for the shoe width. The heat malleable material is subjected to infrared radiation until it becomes plastic and the width of the shoe may be adapted.

US 2014/0000043 A1 and US 2014/0000044 A1 describe methods for the manufacture of articles of footwear for which electromagnetic induction is used to heat up a last on which two or more shoe components are arranged and thus create a connection between the components.

WO 2012/099784 A2 describes a method for Through-Transmission Infrared Welding (TTIR) of plastic components. The surface areas of two plastic components, which are in contact during the welding, are treated before welding to increase the amount of laser energy absorbed in the connection area and thus to support the welding of the touching plastic components. A disadvantage of this method may be that one of the materials has to be transparent or semi-transparent to the laser light.

A common disadvantage of these methods is that the components which are being connected are already in contact when they are heated such that both components are heated up. This can result in a costly, time consuming and inefficient method. It can also be potentially damaging to one or both of the components due to the potentially different melting points of the materials involved (e.g. one material may already have degraded before the other is sufficiently heated). Moreover, in the methods known from the prior art, heat energy may be dissipated in regions of the components that are not involved in the creation of the connection between the components and this unwanted dissipation of heat energy can also be detrimental to the components.

It is therefore an objective underlying the present invention to provide improved methods and devices for the manufacture of sporting goods, for example shoes or sports clothing, which can account for the potentially different material properties of the different components and are fast, efficient and help to save energy. It should further be possible to largely dispense with the use of adhesives.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for the manufacture of sporting goods, the sporting goods comprising a first component with a first connection surface and a second component with a second connection surface, comprises activating at least one portion of the first connection surface by providing heat energy without contact, and connecting the first component with the second component by joining the first and the second connection surfaces.

In some embodiments, connecting the first component with the second component further comprises forming a bond between the at least one portion of the first connection surface and at least one portion of the second connection surface. The bond may be at least one of a chemical bond and a mechanical bond.

In certain embodiments, activating the first connection surface further comprises providing heat energy to the first connection surface such that an activation temperature of at least one material of the first connection surface is reached. In additional embodiments, activating the first connection surface further comprises providing heat energy to the first connection surface such that a viscous layer of at least one material of the first connection surface is formed. In further embodiments, activating the first connection surface further comprises providing heat energy to the first connection surface such that the first connection surface is at least partially melted.

According to some embodiments, connecting the first component and the second component further comprises joining the first and second connection surfaces without an additional adhesive.

In some embodiments, at least one of the first component and the second component comprise one or more of the following: a sole unit, a midsole, an outsole, an outsole element, a sole plate, a film or foil material, a shoe upper, and a functional element.

In certain embodiments, activating may be performed by irradiating with heat energy originating from at least one heat source, in particular by irradiating with infrared radiation originating from at least one infrared radiation source.

In some embodiments, the method further comprises activating at least one portion of the second connection surface by providing heat energy without contact and wherein the first connection surface and the second connection surface are spaced apart during their activation.

In some embodiments, the first connection surface and the second connection surface may be simultaneously activated by heat energy emitted from a common heat source. The common heat source may be arranged in a gap between the first and the second connection surfaces.

In some embodiments, at least one of the second component and the second connection surface comprise a textile material. The textile material may comprise one or more of the following: a knitted construction, a woven construction, a non-woven construction, randomly deposited fibers, a multi-directional layered material, and a mesh structure.

According to some embodiments, the method may further comprise a solidifying of the connection of the first component and the second component. The solidifying may be at least partially performed by cooling.

According to certain embodiments of the present invention, sporting goods comprise a first component with a first connection surface and a second component with a second connection surface, the first connection surface bonded to the second connection surface without an added adhesive, wherein the bond between the first connection surface and the second connection surface has a bonding strength greater than 15 N/cm when measured according to DIN ISO 6133.

In some embodiments, the sporting goods is a shoe. According to certain embodiments, at least one of the first component and the second component comprise one or more of the following: a sole unit, a midsole, an outsole, an outsole element, a sole plate, a film or foil material, a shoe upper, and a functional element.

According to certain embodiments of the present invention, a device for manufacturing sporting goods comprises a first component mounting for receiving a first component and a second component mounting for receiving a second component, and a heat source for providing heat energy without contact, wherein the first and the second component mounting can be moved apart from one another and moved together under pressure.

BRIEF DESCRIPTION OF THE DRAWINGS

In the following detailed description, embodiments of the invention are described referring to the following figures:

FIGS. 1a-c are schematic representations of a manufacturing method, according to certain embodiments of the present invention.

FIGS. 3a-c are schematic representations of a manufacturing method, according to certain embodiments of the present invention.

FIGS. 5a-d are schematic representations of a manufacturing device and illustration of its use to perform the method, according to certain embodiments of the present invention.

FIGS. 7a-c are illustrations of factors that influence the amount of heating, according to certain embodiments of the present invention.

BRIEF DESCRIPTION

Figure 1C:
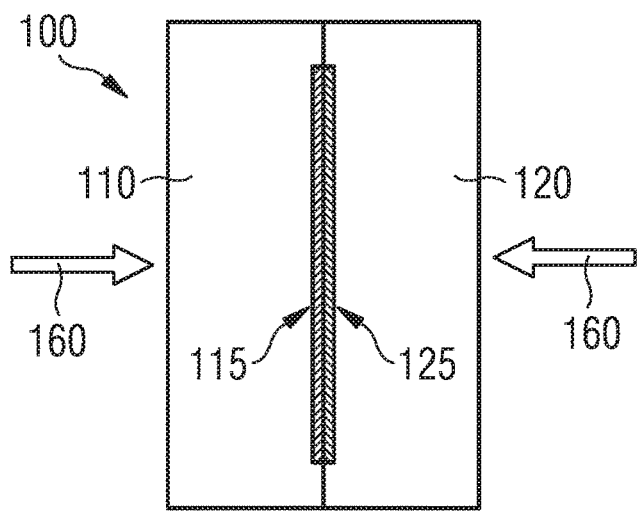

This objective is at least partially solved by a method for the manufacture of sporting goods, in particular a shoe, according to claim 1. In certain embodiments, the method comprises providing a first component with a first connection surface and a second component with a second connection surface, activating at least one portion of the first connection surface by providing heat energy without contact, and connecting the first component with the second component by joining the first and the second connection surfaces.

The skilled person will understand that the role of the first component and the second component can also be reversed, i.e. at least one portion of the second connection surface is activated by providing heat energy without contact. Such a reversal of the roles of the first and second components is also possible for all further embodiments and aspects of the invention described in the following, unless explicitly ruled out.

The first component and the second component may be separately provided, i.e. they may be provided without contacting each other. The first connection surface and the second connection surface may be spaced apart during the activating.

Hence, the heat energy, which is provided without contact to the first connection surface (or a part thereof), may be precisely adjusted to the material properties of the first connection surface and be directly applied to the first connection surface. Thus, the amount of heat energy provided to the first connection surface can be controlled individually, such that too much or too little heating of the first connection surface can be avoided. Unwanted dissipation of heat energy in other parts of the first or second component can also be avoided or at least limited.

Also, activating in a state in which both connection surfaces are spaced apart and subsequently joining the connection surfaces can allow both components to be joined and connected such that the connection surfaces are located in the interior of the finished sporting goods.

Providing heat energy without contact means any type of provision of heat energy that is performed without directly touching the component with the heat source. Any method and/or heat source known in the art that can accomplish this may be employed in the inventive method. Examples are the use of radiation (further details on this will follow below), or heat convection in a gas.

The heat source used for providing the heat energy without contact may be controlled to provide heat energy in a consistent manner across the first connection surface or a part or parts of the first connection surface. The heat source may comprise several individual heat elements that may be individually controlled. These heat elements may provide differing amounts of heat in different areas or parts of the first connection surface. Also, multiple heat sources (each having potentially multiple individual heat elements) may be used to increase the degree of control over the provided amount of heat energy in different regions or parts even further. In general, any heat source known in the art may be used.

The amount of heat energy provided to different regions or parts of the first component and, in particular, the first connection surface may also depend on the geometry of the respective regions and it may further be influenced by the tools (e.g. component mounting) used to perform the method. A component mounting or additional shielding may, for example, be used to shield parts of the first component that should not to be subject to a substantial amount heating. Further details on these points will follow below.

No heat energy may be provided to the second connection surface. Or, heat energy may also be provided to the second connection surface, for example for activating at least one portion of the second connection surface. For example, heat energy may be provided to the second connection surface also without contact (as described in more detail further below). However, it is also possible that heat energy is provided to the second connection surface via direct contact with a heat source, for example via direct contact with an infrared (IR) heat source.

Reference is also made to the fact that the features and embodiments described in the following represent independent aspects of the invention. While these features will be described in the following in relation to embodiments in which the heat energy is provided to the first connection surface without contact, they may also be combined with or used in embodiments in which the first connection surface is activated by providing heat energy via direct contact. For example, the features discussed in the following may be used in combination with embodiments in which the at least one portion of the first connection surface is activated by providing heat energy via direct contact, for example with an IR heat source.

Connecting the first component with the second component may further comprise forming a bond between at least one portion of the first connection surface and at least one portion of the second connection surface. The bond may comprise a chemical bond and/or a mechanical bond.

What kind of bond is formed and how stable this bond is will for example depend on the amount of heat energy provided, the temperature the first connection surface is heated to, the degree of activation, the materials involved, the kind of post-processing or curing, and so forth.

Activating the first connection surface may further comprise providing heat energy to the first connection surface such that an activation temperature of at least one material of the first connection surface is reached.

The first connection surface may for example comprise a material that becomes adhesive when subjected to a certain amount of heat energy or a material that enters into a chemical reaction with a material of the second connection surface when heated above a certain activation temperature. Such materials can have the advantage that they are easily handled when not activated and only become adhesive/reactive selectively upon activation.

Activating the first connection surface may further comprise providing heat energy to the first connection surface such that a viscous layer of at least one material of the first connection surface is formed.

By forming a viscous layer, the adhesion of the first connection surface may be increased such that a connection or bond to the second connection surface may form upon joining the two together. The thickness of the viscous layer that is formed by the activation should be sufficient to allow creating the desired connection with the second connection surface but at the same time not degrade the first connection surface or the first component. What a suitable thickness is in order to achieve these ends can depend to a large degree on the material(s) and geometry of the first connection surface and the first component.

In case heat energy is provided to both connection surfaces, it is possible that only the first connection surface (or the second connection surface, if the roles are reversed) is provided enough heat energy for a viscous layer to form, whereas the second connection surface is only heated to a temperature below the activation temperature of its material or below the temperature at which a viscous layer forms on the second connection surface. In other words, the second component and second connection surface may only be preheated. Or enough heat energy is provided to the second connection surface for a viscous layer also to form there, which can increase the likelihood of a chemical bond to form between the first and the second connection surface.

Activating the first connection surface may further comprises providing heat energy to the first connection surface such that the first connection surface is at least partially melted.

The first and second connection surface may then be joined while the first connection surface is still (partially) melted and after solidifying, a connection between the first and second connection surfaces and thus the first and second components may be established.

To prevent the melted first connection surface from solidifying too early, i.e. before a durable and resilient connection is established, the second connection surface may also be melted, potentially to a smaller or larger degree when compared to the first connection surface, as discussed in further detail below.

The temperature the first connection surface is heated up to, which will in turn have an influence on the kind of activation that is effected, will depend on various variables, e.g. the power emitted by the heat source, the heating time, the distance between the heat source and the first connection surface, and the material being heated.

Figure 6:
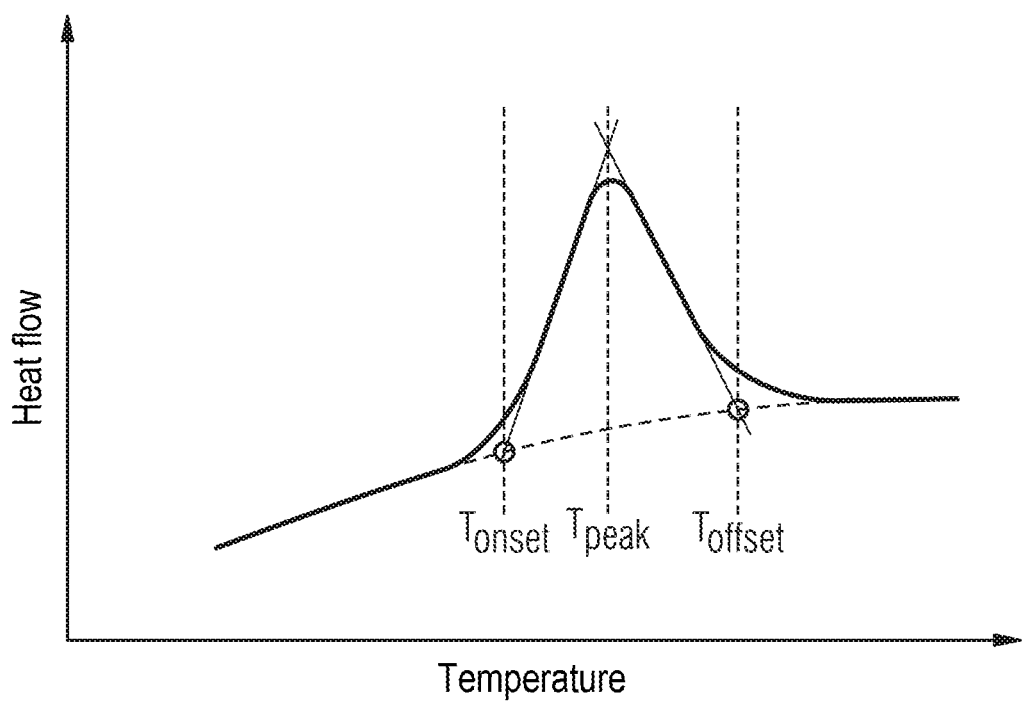
FIG. 6 is an illustration of the onset of melting and the melting peak by means of a heat flow vs. temperature-plot, according to certain embodiments of the present invention.

The temperature the first connection surface is heated up to can, for example, be chosen to be the temperature at which the viscous layer is formed (s. above). In this case the temperature the first connection surface is heated up to can be chosen to be below the degradation temperature (measured by TGA), to be below the melting peak (measured by DSC) and to be below the onset of melting. Or it can be chosen to coincide with the onset of melting. The terms melting peak and onset of melting are illustrated in FIG. 6 where the heat flow into a material is plotted over the temperature of the material in a temperature range containing the melting temperature of the material. $T_{onset}$ defines the onset of melting, $T_{peak}$ the melting peak and $T_{offset}$ the offset of the melting.

A suitable heating time will in general also depend on a number of variables that may further be correlated to each other. For example, the power emitted by the heat source, the distance of the heat source and the intended temperature the first connection surface is heated up to can all influence the proper heating time and they can be correlated to each other (e.g. moving the heat source closer and/or increasing its output power will increase the achieved temperature given the same heating time). The proper heating can also depend on factors like the material and geometry of the first component and first connection surface. The heating time may also be adjusted for process optimization.

Due to the complicated interdependencies of this plethora of variables, only some exemplary values are listed in the following. The skilled person will adjust these values to the given conditions in a suitable manner.

The heating time can for example be in the region of 1 min, for example between 55 s and 65 s. The heating time can also be shorter, e.g. 5 s or 10 s or 20 s. The heating time may also lie in between, e.g. in the region of half a minute.

Connecting the first component and the second component may in particular comprise joining the first and second connection surfaces without an additional adhesive.

As already mentioned, such adhesives can be harmful to humans and also environmentally hazardous, as well as cumbersome to handle, highly inflammable and may generally complicate the manufacturing process.

The first component may comprise a thermoplastic material. The first connection surface may comprise a thermoplastic material.

Thermoplastic materials are well suited to be activated by providing heat energy without contact. After the connection between the first and second connection surfaces has formed, thermoplastic materials may to a large extent regain the properties they had before activation. In other words, activating thermoplastic materials by providing heat energy may be possible without detrimental effects to the materials.

The first component and/or the first connection surface may comprise one or more of the following materials: thermoplastic polyurethane (TPU), a polyamide (PA) such as PA4.10, PA6, PA6.6, PA6.10, PA10.10, PA11 or PA12, a polyetherblockamide (PEBA), a co-polyester, a polyolefin such as a polyethylene (PE) or polypropylene (PP), a polyolefinic elastomer (POE) such as polyisobutylene (PIB), ethylene propylene rubber (EPR) or ethylene propylene diene monomer (M-class) rubber (EPDM), a block copolymer such as an olefin block copolymer (OBC).

The first component and/or the first connection surface may comprise a foamed or expanded material such as, for example, expanded thermoplastic polyurethane (eTPU), an expanded polyamide (ePA) and/or an expanded polyetherblockamide (ePEBA).

The first component and/or the first connection surface may comprise particles of an expanded material, for example particles of eTPU and/or ePA and/or ePEBA. The particles may be randomly arranged or they may, at least partially, be aligned or otherwise intentionally arranged. The particles may be connected at their surfaces.

The benefits of using a foamed or expanded material in the first connection surface may include the increased insulative properties of such materials, allowing the temperature at the surface to be increased while the temperature inside the first component remains rather low such that unwanted effects on these regions by the heat energy can be avoided or limited.

It is again mentioned that the materials mentioned above as possible materials for the first connection surface are also possible materials for the first component. The first component and the first connection surface may form one integral component of the same material(s). As an example, the first component may be made from particles of an expanded material, e.g. particles of eTPU.

A first component comprising or made of particles of an expanded material may be well suitable for, for example, a midsole due to the particularly good elastic properties and the low weight of the particles. However, such first components may also be employed for other types of sporting goods, for example, for components that assume a dampening function, such as knee or elbow protectors.

The first connection surface may also have a material composition different from the rest of the first component or parts of the first component to better meet the specific requirements for forming a durable connection with the second connection surface. The first component may, for example, comprise multiple layers with the first connection surface being formed by one of these layers at a surface of the first component. The first connection surface may furthermore comprise a mixture of different materials and may itself comprise multiple layers to allow a very precise control of the activation process. Similar statements apply to the second component and the second connection surface.

The first component and/or the second component may comprise one or more of the following: a sole unit, a midsole, an outsole, an outsole element, a sole plate, a film or foil material, a shoe upper, a functional element.

A functional element may, for example, comprise one or more of the following: a stabilizing element, a torsion bar, a heel cap, and so forth.

Embodiments of the inventive method may for example be used to connect a midsole of a shoe to a shoe upper, a midsole to a functional element (e.g., stability elements), a functional element (e.g., a heel cap) to a shoe upper, a midsole to an outsole, an outsole to a functional element (e.g., a torsion bar), or to connect film or foil materials to various components (e.g. to a midsole, upper or outsole) for structural or visual reasons.

The activating may be performed by irradiating with heat energy originating from at least one heat source. The activating may be performed by irradiating with infrared radiation (IR-radiation) originating from at least one IR-radiation source. The wavelength emitted by the IR-radiation source could, for example, lie in the range 700 nm-1400 nm, or it could lie in the range 1400 nm-3000 nm.

The activating may be performed by electromagnetic heating. For example, the activating may be performed by irradiating with radiation in the microwave range, 300 MHz-300 GHz, or with radiation in the radio frequency range, 30 kHz-300 MHz. Different kinds of radiation with wavelengths from different ranges of the electromagnetic spectrum may also be combined.

The heat source can in general be any heat source known in the art. Merely to give some examples, the heat source could comprise a laser or a hot radiation plate.

An advantage of using infrared radiation may be that it is easy to produce and to provide to the first connection surface. The amount of heat energy provided to a surface by IR-radiation may, for example, be controlled by adjusting the output power of the sources, the intensity of the radiation, the size or emitted wavelength of the IR-sources, the distances of the sources to the surface, the view factor of the surface, i.e. how much of the emitted energy the surface intercepts, or the emissivity of the surface material, etc. Moreover, the use of infrared radiation does not impose any particular requirements, such as electrical conductivity, on the material of the first connection surface.

The method may further comprise activating at least one portion of the second connection surface by providing heat energy without contact, wherein the first connection surface and the second connection surface are spaced apart during their activation.

Everything that has been said so far about activating the first connection surface (e.g. possible kinds of activation, temperature the first connection surface is heated up to, heating time, . . . ) may also apply to activating the second connection surface. For the sake of clarity and conciseness, these statements are not repeated here.

The first connection surface and the second connection surface may simultaneously be activated by heat energy emitted from a common heat source. As an example, the first and second connection surface may be simultaneously activated by simultaneous irradiation with IR-radiation from a common IR-radiation source.

By simultaneously irradiating with infrared radiation, the number of steps necessary for performing the method can be reduced and the manufacturing expense can be reduced. Energy can also be saved as a result. If a common IR-radiation source is used, a less complex device can be used for performing the method. The IR-radiation source may comprise just a single IR-lamp, e.g. a type of IR fluorescent tube, which simultaneously irradiates the first and the second connection surfaces. Or, an IR-radiation source may include several IR-lamps that irradiate the first and the second connections surface separately. It also possible that several separate IR-radiation sources are used.

The common heat source may be arranged in a gap between the first and the second connection surfaces.

By arranging the heat source in the gap between the first and second connection surface, the dimensions of a device for performing the method may be kept small. In addition, as the two components may be arranged on both sides of the heat source, loss of energy through radiation not hitting the components can be reduced and the method can thus be designed in a more energy-efficient manner. The first and the second components may be arranged such that the first and second connection surfaces are parallel to one another while the heat source is arranged between the two connection surfaces. However, other arrangements, e.g. an arrangement in which the two connection surfaces are not parallel and define a wedge shaped gap in which the heat source is arranged, are also possible.

Prior to connecting the first component with the second component, the common heat source can be removed from the gap between the first and the second connection surfaces.

The dimensions of a corresponding manufacturing device can also be kept small with a heat source that can be moved in this manner. In addition, the time between activating and joining the two connection surfaces can be reduced by an arrangement in which the heat source is first moved into the gap for activating and moved out again before joining the two connection surfaces. On one hand, this can reduce the duration of manufacture. On the other hand, this may also be necessary to avoid the activation subsiding again before the components are connected.

The second component and/or the second connection surface may comprise a textile material. The textile material may comprise one or more of the following constructions: knitted, woven and/or non-woven. The textile material may comprise randomly deposited fibers, a multi-directional layered material and/or a mesh structure.

The second component, the second connection surface and/or the textile material may comprise one or more of the following materials: polyethylene terephthalate (PET), polybutylene terephthalate (PBT), a polyamide (PA) such as Pa4.10, PA6, PA10.10, PA12, PA66, PA610, PA612 or a different grade, polyurethane (PU), a polyolefin such as a polyethylene (PE), polypropylene (PP), a polyolefinic elastomer (POE) such as polyisobutylene (PIB), ethylene propylene rubber (EPR) or ethylene propylene diene monomer (M-class) rubber (EPDM), a block copolymer such as an olefin block copolymer.

Alternatively or in addition, the second component, the second connection surface and/or the textile material may comprise one or more of the following materials: thermoplastic polyurethane (TPU), a foamed or expanded material such as expanded thermoplastic polyurethane (eTPU), and expanded polyamide (ePA) or an expanded polyetherblockamide (ePEBA), a non-foamed or compact material, rubber.

The textile material can be created using different techniques known in the art. A textile material may be beneficially employed in parts of sporting goods that require good ventilation or breathability like a shoe upper or a jacket, to name only two examples.

Moreover, in combination with the possible materials for the first component/first connection surface mentioned above, the aforementioned possible materials for the second component/second connection surface/textile material can have the advantage of being compatible with one another in the sense that they may form a durable and stable connection.

Joining the first and second connection surfaces may be performed under pressure.

Joining the first and the second connection surfaces under pressure may increase the stability of the connection thus produced.

The first connection surface and the second connection surface may e.g. be pressed together for a pre-determined duration and with a certain pressure in order to produce a stable and durable connection. A suitable duration will in general depend on different factors including, for example, the material used, the manner and duration of activation, the size of the respective connection surfaces, whether or not an additional binding agent is used, etc.

The method may comprise a solidifying of the connection of the first component and the second component. The solidifying may at least be partially performed by cooling.

Solidifying the connection may be beneficial after joining the two connection surfaces as it may increase the durability and strength of the connection produced. Solidifying the connection may, for example, involve allowing the connection to cool for a period of time. The time necessary for solidifying the connection may vary, for example, due to the ambient temperature, heat capacity of materials, geometry of the components, etc.

The cooling may comprise active cooling.

Actively cooling the connection may, on the one hand, accelerate the manufacturing process. On the other hand, it is also possible that actively cooling contributes to establishing a stable and durable connection.

A bonding strength of the bond between the first and second connection surfaces may be above 10 N/cm when measured according to DIN ISO 6133. The bonding strength may also be above 25 N/cm, and it may be above 50 N/mm.

In a measurement according to DIN ISO 6133, a preload of 1 N is applied to two components which are peeled apart at a test speed of 50 mm/min. The test range is 100 mm. The result is given as the arithmetic mean peel force between the $1^{st}$ peak and the end of the measurement.

Embodiments of the inventive method for the manufacture of sporting goods may be automated, wherein the different method steps (e.g. moving in/out of the heat source, activation, joining of the connections surfaces, etc.) may be directly coordinated with each other. Embodiments of the method may furthermore be part of a production line. Again this production line may be partly or fully automated. In such a production line, components may be fed into the line and be passed on to different processing stations. Examples of such production lines that may be used in combination with the present invention are disclosed in EP 2 862 467 A1 or EP 2 865 289 A1.

A further aspect of the present invention is given by sporting goods, in particular a shoe, manufactured according to certain embodiments of an inventive method.

In the manufacture of such sporting goods, the optional features and steps of an inventive method described herein may be combined with each other as desired or individual features or steps may be omitted if deemed unnecessary in order to meet a particular requirement specification for the sporting goods.

The sporting goods may comprise a first component and a second component connected to the first component without an added adhesive, wherein a bond between the first component and the second component has a bonding strength greater than 15 N/cm when measured according to DIN ISO 6133.

The sporting goods may be a shoe. However, it is emphasized that the present invention is not limited to shoes but may also be applied to other kinds of sporting goods like sports apparel or clothing, protection elements, or sports equipment like rackets.

A further aspect of the invention is given by a device for performing a method according to the invention. The device may comprise a first component mounting for receiving a first component and a second component mounting for receiving a second component as well as a heat source for providing heat energy without contact, wherein the first and the second component mountings can be moved apart from one another and moved together under pressure.

A manufacturing device designed in such a way may take up only a relatively small amount of building space and it may allow the manufacture to be automated to a large extent. It can therefore be particularly suitable for series and mass production. The various manufacturing parameters (e.g. the parameters described above, such as heating time, distance and power of the heat source, pressure, duration of joining/pressing) may also be individually adjusted so that individualized sporting goods can be manufactured using a single manufacturing device.

In particular, an inventive manufacturing device may be automated and/or it may be part of a larger production line, as discussed in relation to embodiments of the inventive method above.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Possible embodiments of the present invention are described in the following detailed description, mainly in relation to the manufacture of sporting goods. However, emphasis is once again placed on the fact that the present invention is not limited to these embodiments. The method described herein may be used for the manufacture of sporting goods in general, such as, for example, sport shoes, sports clothing, or sports equipment such as rackets.

It is also to be noted that individual embodiments of the invention are described in greater detail below. However, it is clear to the person skilled in the art that the design possibilities and optional features described in relation to these specific embodiments can be further modified and combined with one another in a different manner within the scope of the present invention and that individual steps or features can also be omitted where they appear to be unnecessary. In order to avoid redundancies, reference is made to the explanations in the previous sections, which also apply to the following detailed description.

In the following, like reference numerals will be used to designate functionally similar or equivalent steps, features or components in order to facilitate the understanding.

FIGS. 1a-c show an embodiment of a manufacturing method 100 according to the invention for the manufacture of sporting goods, for example a shoe.

The method 100 includes providing a first component 110 with a first connection surface 115 and a second component 120 with a second connection surface 125.

The first component 110 and the second component 120 may be separately provided, i.e. they may initially be provided without contacting each other.

The first connection surface 115 may comprise the same material(s) as the rest of the first component 110 and the first connection surface 115 may simply be given by that surface of the first component 110 that is intended to be connected to the second component 120. It is also possible that the first connection surface 115 comprise additional and/or different materials compared to the rest of the first component 110 and these materials may be particularly suitable for producing a stable and durable connection of the first component 110 with the second component 120. The first component 110 may e.g. comprise several layers and an outmost one of these layers may constitute the first connection surface 115. Or the first connection surface 115 may itself comprise several layers, potentially with different materials.

Analogous statements also apply to the second connection surface 125 of the second component 120.

The first component 110 and/or the first connection surface 115 may comprise a thermoplastic material.

The first component 110 and/or the first connection surface 115 may comprise one or more of the following materials: thermoplastic polyurethane (TPU), a polyamide (PA) such as PA4.10, PA6, PA6.6, PA6.10, PA10.10, PA11 or PA12, a polyetherblockamide (PEBA), a co-polyester, a polyolefin such as a polyethylene (PE) or polypropylene (PP), a polyolefinic elastomer (POE) such as polyisobutylene (PIB), ethylene propylene rubber (EPR) or ethylene propylene diene monomer (M-class) rubber (EPDM) a block copolymer such as an olefin block copolymer (OBC).

The first component 110 and/or the first connection surface 115 may comprise a foamed or expanded material. For example, first component 110 and/or the first connection surface 115 may comprise one or more of the following expanded materials: expanded thermoplastic polyurethane (eTPU), an expanded polyamide (ePA), an expanded polyetherblockamide (ePEBA).

The first component 110 and/or the first connection surface 115 may comprise particles of an expanded material, e.g. particles of eTPU, ePA and/or ePEBA. The particles may be at least partially arranged or aligned to each other, they may be randomly arranged, or a combination of arranged and randomly arranged particles may be used. The particles may be connected at their surfaces.

As an example, the first component 110 may comprise randomly arranged particles of eTPU which are fused at their surfaces. The first connection surface 115 may in this case simply be given by the surface of the first component 110 in the region where the first component 110 will be connected to the second component 120. The first connection surface 115 will then also comprise fused particles of eTPU.

The second component 120 and/or the second connection surface 125 may comprise a textile material. The textile material may comprise one or more of the following constructions: knitted, woven and/or non-woven. The textile material may comprise randomly deposited fibers, a multi-directional layered material and/or a mesh structure.

The second component 120, the second connection surface 125 and/or the textile material may comprise one or more of the following materials: polyethylene terephthalate (PET), polybutylene terephthalate (PBT), a polyamide (PA) such as PA 4.10, PA6, PA10.10, PA12, PA66, PA610, PA612 or a different grade, polyurethane (PU), a polyolefin such as a polyethylene (PE) or polypropylene (PP), a polyolefinic elastomer (POE) such as polyisobutylene (PIB), ethylene propylene rubber (EPR) or ethylene propylene diene monomer (M-class) rubber (EPDM), a block copolymer such as an olefin block copolymer (OBC).

Alternatively or in addition, the second component 120, the second connection surface 125 and/or the textile material may comprise one or more of the following materials: thermoplastic polyurethane (TPU), a foamed or expanded material such as eTPU, ePA and/or ePEBA, a non-foamed or compact material, rubber.

The first component 110 and/or the second component 120 may for example be a sole unit, a midsole, an outsole, an outsole element, a sole plate, a film or foil material, a shoe upper, or a functional element (like, e.g., a stabilizing element, a torsion bar or a heel cap) or comprise one or more such elements.

The following Table 1 lists some possible combinations of first and second components 110 and 120 that may be connected to each other by use of the inventive method 100 for the case the method 100 is applied to the manufacture of a shoe. The roles of the first and second components 110 and 120 may also be reversed. However, emphasize is put on the fact that these are mere examples which may not be construed as limiting the scope of the invention.

TABLE I

| first component 110 | second component 120 |
|---|---|
| Midsole | shoe upper |
| Midsole | functional element (e.g., stability element like) |
| functional component (e.g., heel cap) | shoe upper |
| Midsole | Outsole |
| Outsole | functional component (e.g., torsion bar) |
| film/foil | various components (e.g., midsole, upper, outsole) |

The method 100 comprises activating at least one portion of the first connection surface 115. In the case shown in FIGS. 1a-c, the entire first connection surface 115 is activated. In other embodiments, only one or more partial regions of the first connection surface 115 may be activated, if this is sufficient to enable creating a connection between the first component 110 and the second component 120 with the desired characteristics, in particular the desired strength.

It is generally remarked again that the roles of the first component 110 and the second component 120 may also be reversed or swapped.

To activate the first connection surface 115, heat energy 135 is provided to the first connection surface 115. The heat energy 135 may be provided to the first connection surface 115 without having to contact the first component 110 or the first connection surface 115. In the embodiment shown in FIGS. 1a-c, only the first connection surface is activated, while the second connection surface 125 is not activated since no heat energy is provided to the second connection surface 125. In other embodiments (s. FIGS. 3a-c, 4, 5a-d) this may be different. Activating only one connection surface 115 may safe energy and time and make the method more efficient. Activating only the first connection surface 115 may for example also be appropriate if the second connection surface 125 comprises a material that quickly degrades under the direct influence of heat.

Activating the first connection surface 115 may for example be performed by irradiating the first connection surface 115 with heat energy 135 originating from at least one heat source 130.

The heat source 130 may for example be an infrared (IR) heat source that irradiates the first connection surface 115 with IR-radiation.

The heat source 130 may also irradiate the first connection surface 115 with radiation in the microwave range, 300 MHz-300 GHz, or with radiation in the radio frequency range, 30 kHz-300 MHz, or with radiation from a different range of the electromagnetic spectrum.

The heat source 130 may comprise individually controlled heat elements, which may e.g. provide differing amounts of heat energy 135 to different areas of the first connection surface 115. It is also possible that multiple heat sources are used instead of just the one heat source 130 as shown here. In general, any heat source known in the art can be used.

Moreover, as has already been mentioned before, it is in general also conceivable that the heat energy is provided via direct contact with the heat source, e.g. via direct contact with an IR-heat source.

The heat energy 135 may be controlled. By controlling the amount of heat energy provided to the first connection surface, the temperature the first connection surface 115 will be heated up to can be controlled. The heat energy 135 provided to the first connection surface 115 may for example be controlled by varying one or more of the following variables and parameters:

The heating time: The heating time can for example be in the region of 1 min, for example between 55 s and 65 s. The heating time can also be shorter, e.g. 5 s or 10 s or 20 s. The heating time may also lie in between, e.g. in the region of half a minute.

The distance of the heat source 130 to the first connection surface 115 during activating: A suitable distance may depend on the efficiency of the heat source 130 and the energy loss to the surroundings. A more efficient heat source like, for example, a laser could be further away than a less efficient heat source 130. If, for example, an IR heat source is used, the distance may be below 1 m, it may be below 50 cm or it may even be below 10 cm. Depending, for example, on the geometry of the component, it can also be beneficial to have the heat source 130 as close as possible while avoiding contact (for a contactless provision of heat).

The amount of heat energy absorbed by the first connection surface may also depend on the coefficient of absorption of the material of the first connection surface 115 with regard to the kind of heat energy (e.g. IR-radiation) provided.

The skilled person will understand that this are merely some examples of parameters that can potentially influence the amount of heat energy provided to the first connection surface 115. Also, some or all of these parameters may be correlated or interdependent.

A suitable temperature for the first connection surface 115 to be heated up to can also depend on a number of variables, for example: the kind of activation that shall be achieved (s. immediately below) and/or the geometry and material composition of the first component 110 and the first connection surface 115. Again, these are just examples.

For example, the heat energy 135 may be controlled such that an activation temperature of at least one material of the first connection surface 115 is reached. By heating the first connection surface 115 up to a temperature equal or higher than the respective material's activation temperature, the material may e.g. become adhesive or it might become chemically reactive.

The heat energy 135 may also be controlled such that at least one material of the first connection surface 115 forms a viscous layer.

The temperature necessary for the material to form a viscous layer may for example coincide with the activation temperature of the material as discussed immediately above. The temperature at which the viscous layer forms may, for example, be a temperature which lies below the degradation temperature of the material (measured by TGA) temperature, below the melting peak of the material (measured by DSC), and below the onset of melting. Or it may coincide with the onset of melting.

FIG. 6 illustrates the terms melting peak and onset of melting. FIG. 6 shows the heat flow into a material plotted over the temperature of the material, in a temperature range containing the melting temperature of the material. $T_{onset}$ defines the onset of melting, $T_{peak}$ the melting peak and $T_{offset}$ the offset of the melting.

The heat energy 135 may also be provided such that the first connection surface 115 is at least partially melted. The first connection surface 115 may e.g. be melted beyond the formation of a viscous layer to a more strongly melted state. After connection with the second connection surface 125, the material may solidify again and form a mechanical bond to the second connection surface 125.

The heat energy 135 may be provided to the first connection surface 115 while the first connection surface 115 and the second connection surface 125 are spaced apart, i.e. do not touch, as shown in FIG. 1a. In this manner, the amount of heat energy provided can be precisely adjusted to achieve the desired degree of activation of the first connection surface 115 without having to consider e.g. degradation of the second component 120 or other unwanted influence on the second component 120.

The method 100 also comprises connecting the first component 110 with the second component 120 by joining the first and the second connection surface 115, 125 as shown in FIG. 1b and indicated by the arrows depicting the movement 150 of the first and second components 110, 120. The connecting may comprise forming a bond between at least one portion of the first connection surface 115 and at least one portion of the second connection surface 125. For example, a bond may form between the activated portion of the first connection surface 115 and the portion of the second connection surface 125 touching this activated portion of the first connection surface 115.

The bond may be a chemical bond (e.g. if the first connection surface is heated to the activation temperature of a material and/or to a temperature where a viscous layer forms) and/or the bond may also be a mechanical bond (e.g. if the first connection surface is at least partially melted).

Connecting the first component 110 and the second component 120 may thus comprise joining the first connection surface 115 and the second connection surface 125 without an additional adhesive. However, such an adhesive can also be added if deemed advantageous.

The method 100 may also comprise solidifying of the connection of the first component 110 and the second component 120, for example by cooling, in some instances by active cooling. In some instances, the first component 110 and the second component 120 may be joined under pressure, as indicated in FIG. 1c by the arrows 160. Only as an example, a pressure in the range of 1-2 N/mm may be suitable.

A further noteworthy point in relation to FIG. 1c is that it shows that the connection surfaces 115 and 125 can only take up a part of the complete contact area in which the first component 110 and the second component 120 touch each other after connecting. How large the share of the connection surfaces 115 and 125 of this contact area is will e.g. depend on how strong the connection is intended to be. Also, the connection surfaces 115 and/or 125 may comprise several disconnected partial regions.

In any case, it can be advantageous for the bond between the first connection surface 115 and the second connection surface 125 to have a bonding strength (measured according to DIN ISO 6133) above 10 N/cm, or above 25 N/cm, or above 50 N/cm.

Figure 2A:
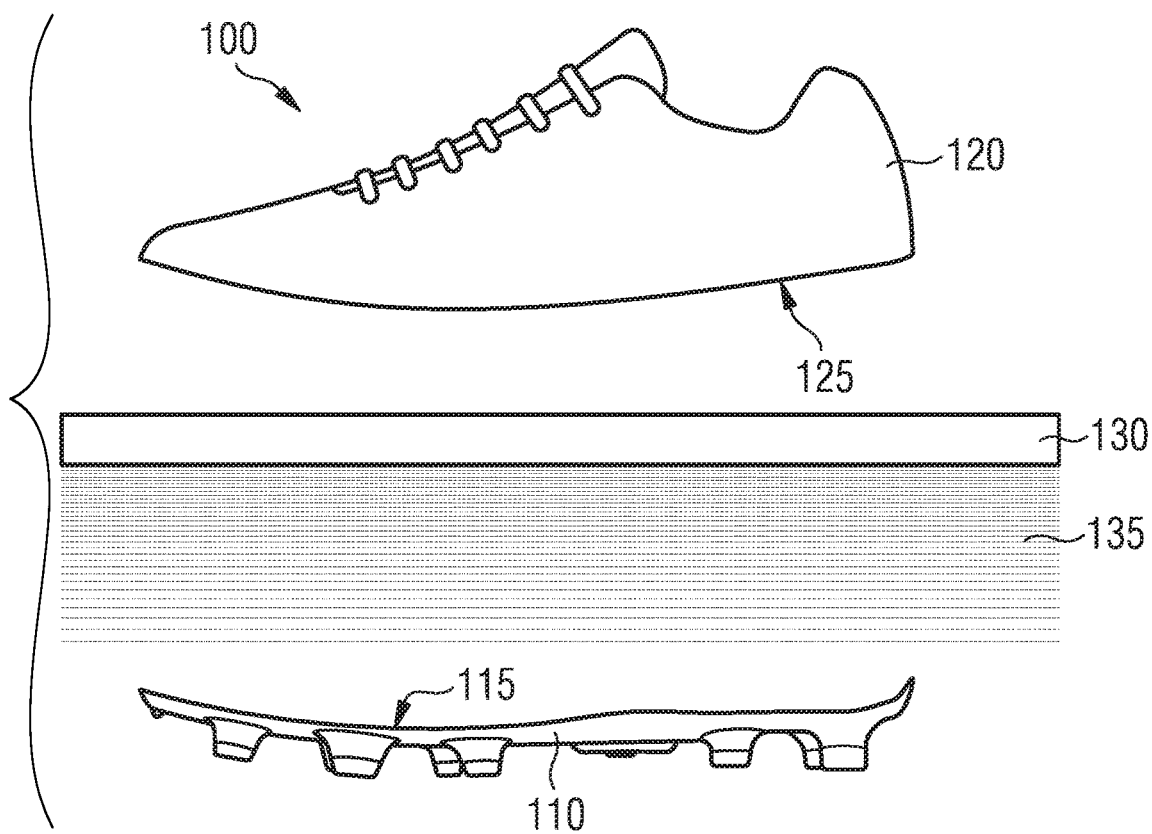
FIGS. 2a-c are schematic representations of a manufacturing method for the manufacture of a shoe, according to certain embodiments of the present invention.
Figure 2B:
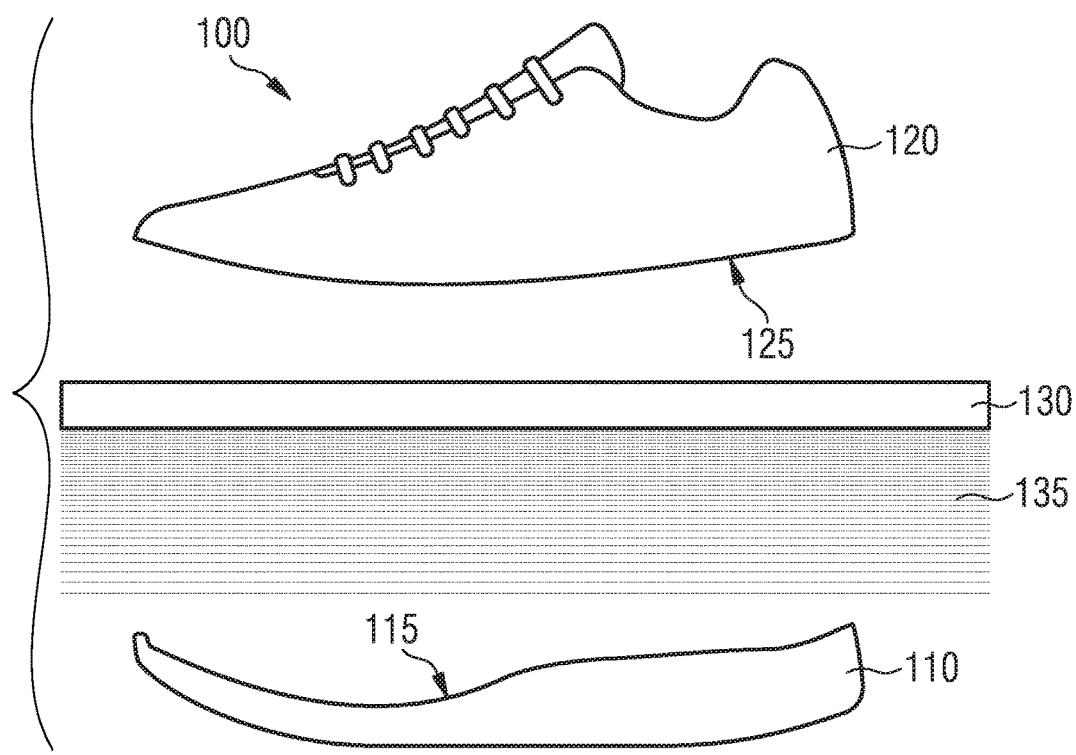
Figure 2C:
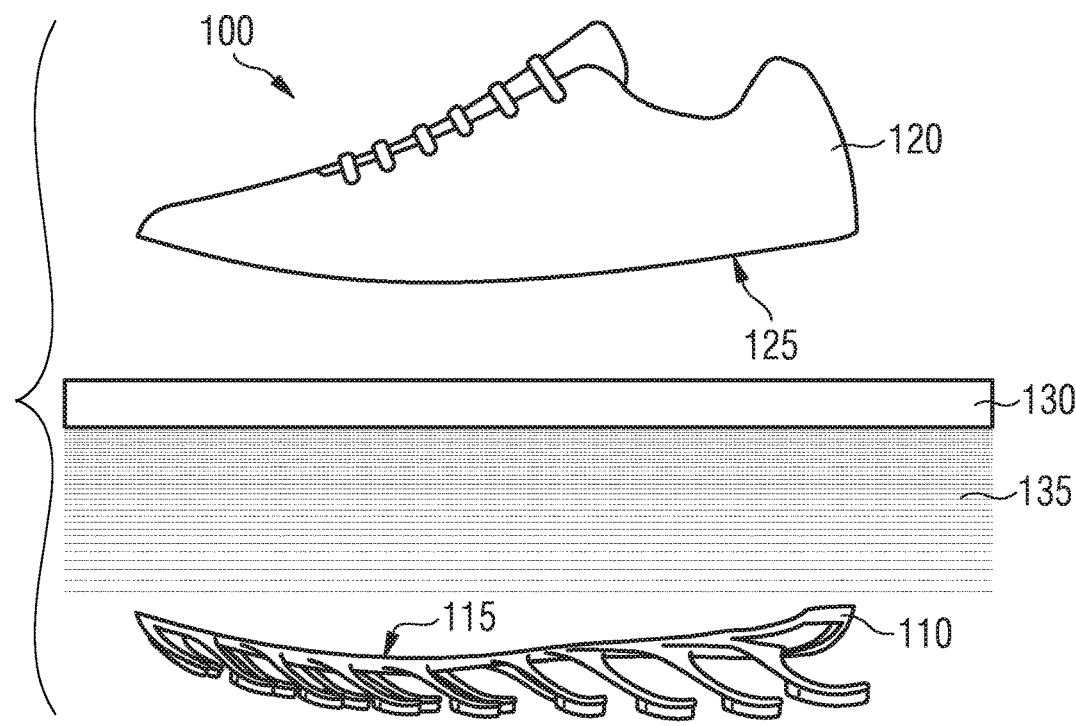

FIGS. 2a-c show exemplary embodiments of the method 100 for the manufacture of different kinds of shoes.

In each case, a first component 110 is provided, which is a sole unit. A second component 120 is also provided, which is a shoe upper. Each sole unit comprises a first connection surface 115 which is activated by being providing with heat energy 135 from a heat source 130 without contact. After activating, the first connection surface 115 will be joined with a corresponding second connection surface 125 of the shoe upper to form a shoe. The first connection surface 115 may, for example, be located along the rim of the sole unit and the second connection surface 125 may be located along the rim of the shoe upper. Or the entire (or predominant part) of the top surface of the sole unit may form the first connection surface 115 and the entire (or predominant part) of the bottom side of the shoe upper may form the second connection surface 125.

The first component 110 shown in FIG. 2a can e.g. be used in a football shoe. The first connection surface 115 may, for example, comprise one or more of the following materials: thermoplastics, such as a polyamide or thermoplastic polyurethane, etc.

The first component 110 shown in FIG. 2b can, for example, be used for a running shoe. It can, for example, be made from particles of eTPU that are fused at their surfaces. As shown in FIG. 2b, these particles of expanded foam may be randomly arranged.

The first component 110 shown in FIG. 2c can e.g. also be used for a running shoe or a leisure shoe. The first connection surface 115 may, for example, comprise one or more of the following materials: thermoplastics, such as a polyamide or thermoplastic polyurethane, etc.

The second component 120, i.e. the shoe upper, can, for example, comprise a textile material, which may also extend onto the second connection surface 125.

The textile material can comprise one or more of the following constructions: knitted, woven and/or non-woven. The textile material can comprise randomly deposited fibers, a multi-directional layered material and/or a mesh structure.

Suitable materials for the second component 120, the second connection surface 125 and/or the textile material have already been mentioned.

Figure 3C:
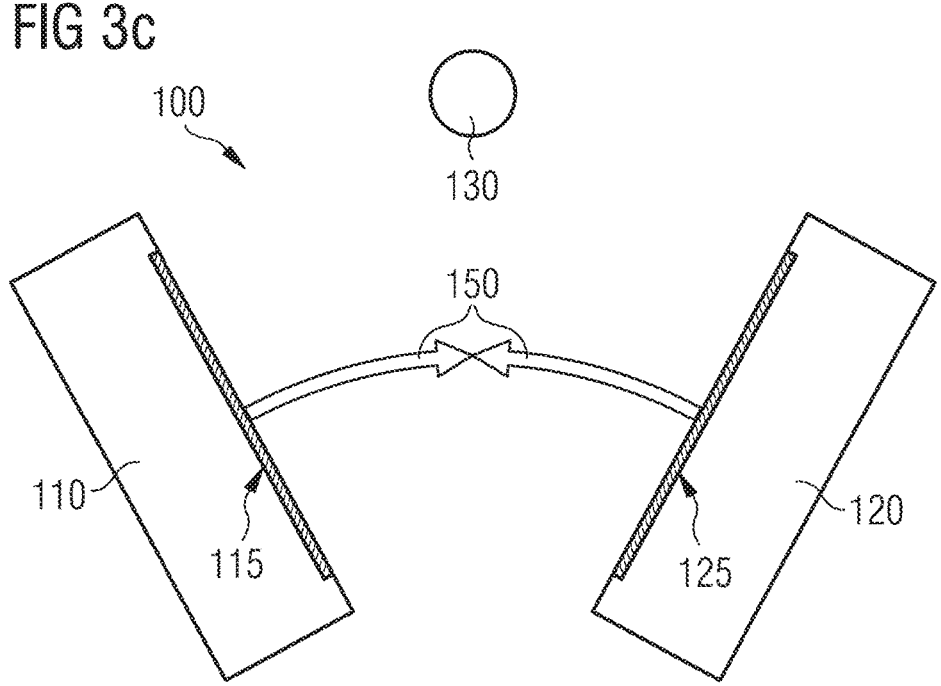

FIGS. 3a-c show a further embodiment of the method 100. Also this embodiment of the method 100 comprises providing a first component 110 and a second component 120. The first component 110 comprises a first connection surface 115. The second component 120 comprises a second connection surface 125. The method 100 further comprises activating at least one portion of the first connection surface 115 and activating at least one portion of the second connection surface 125 by providing heat energy 135 without contact.

As shown in FIG. 3a, the first component 110 and the second component 120 may be separately provided and the first connection surface 115 and the second connection surface 125 may be spaced apart during their activation, i.e. do not touch.

The method 100 also comprises connecting the first component 110 with the second component 120 by joining the first and the second connection surface 115, 125 as shown in FIG. 3c and indicated by the arrows depicting the movement 150 of the first and second components 110, 120.

Regarding the activation of the second connection surface 125, all statements made in this document with regard to the activation of the first connection surface 115 may apply analogously. For the sake of clarity and conciseness, these statements are not repeated for the second connection surface 125. Only some examples will be briefly discussed in more detail below.

Activating may for example comprise at least partially melting the first connection surface 115 and the second connection surface 125. For example, both connection surfaces 115, 125 may at least partially be melted and subsequently joined. The connection thus produced between the first component 110 and the second component 120 can then solidify, e.g. during cooling, to form a mechanical bond. Solidifying can also be facilitated, for example, by active cooling.

In the simplest case, both connection surfaces 115 and 125 are melted to the same extent. However, it is also conceivable that the first connection surface 115 and the second connection surface 125 are melted to a different extent.

This may be achieved, for example, by the amount of heat energy 135, which is provided to the respective connection surface 115, 125, being different. For example, the second connection surface 125 may not be heated to the same extent as the first connection surface 115. The second connection surface 125 could, for example, be a surface of a shoe upper and the first connection surface 115 could be a surface of a shoe sole, wherein the heating of the second connection surface 125 of the upper could only be a fraction of the heating of the first connection surface 115 of the sole. Heating the second connection surface 125 may prevent the melted region of the first connection surface 115 of the sole from solidifying too fast as the melt should penetrate into the mesh of the upper to establish a durable and resilient connection. Similar considerations can also apply to components other than an upper and a sole and they may also apply to other embodiments of the inventive method or an inventive manufacturing device, for example those discussed in relation to FIG. 4 or FIGS. 5a-d.

Alternatively or additionally, both connection surfaces 115 and 125 may comprise different materials, for example materials with different melting temperatures or ranges, such that the connection surfaces 115 and 125 melt to a different extent when providing the same amount of heat energy 135 to them.

It is also possible that one or both connection surfaces 115, 125 may first be coated with an adhesive that only becomes adhesive once activated and which is then activated by providing heat energy 135 without contact. Other possibilities are obvious to the person skilled in the art.

As shown in FIG. 3a, the activating may be performed by irradiating with heat energy 135 from a heat source 130. The activating may e.g. be performed by irradiating with infrared radiation (IR-radiation) from an IR-radiation source. However, in principle, any heat source known from the art is also possible and other options for providing heat energy 135 without contact, such as using heat convection in a gas, are also conceivable.

The first and second connection surfaces 115, 125 can be activated simultaneously by heat energy 135 emitted from a common heat source 130, as is the case in FIG. 3a. However, it is also conceivable that the connection surfaces 115, 125 are activated one after the other, for different lengths of time or only partially simultaneously. The first and second connection surfaces 115, 125 may for example be irradiated with IR-radiation from a common IR-radiation source.

The common heat source 130 may be arranged such that the heat energy 135 is focused on the first and the second connection surfaces 115, 125. On the one hand, unintended damage to the rest of the first component 110 and the second component 120 can thus be avoided. On the other hand, energy can thus be saved.

Alternatively, e.g. in order to improve focusing, several heat sources may also be used, which do not necessarily each irradiate both connection surfaces 115, 125 simultaneously.

If both connection surfaces 115, 125 are simultaneously irradiated, it can further be advantageous if the heat source 130 is arranged in a gap 138 between the first connection surface 115 and the second connection surface 125, as shown in FIG. 3a. However, such an arrangement may also be advantageous where irradiating is not, or only partially, performed simultaneously or where several heat sources are used. The dimensions of this gap 138 are indicated by a dashed line in FIG. 3a. In order to allow for the joining of the first and the second connection surfaces 115, 125, the heat source 130 can be removed from the gap 138 between the first and the second connection surfaces 115, 125 prior to joining, as indicated in FIG. 3b by the arrow 140. Where several heat sources are used, the foregoing statements apply analogously.

The skilled person will readily understand that the statements made with regard to the embodiment shown in FIGS. 1a-c in relation to controlling the amount of heat provided and the temperature reached in the first connection surfaces 115 (e.g. by varying the heating time, power and distance of the heat source, and so forth) can be generalized and applied to the embodiment shown in FIGS. 3a-c where both connection surfaces 115 and 125 are activated, potentially simultaneously. These statements are therefore not repeated here.

Following the activation and if necessary the removal 140 of the heat source 130 from the gap 138, the first connection surface 115 and the second connection surface 125 are joined, as indicated in FIG. 3c, in order to produce a connection of the first component 110 with the second component 120.

The joining can be performed under pressure, as was already discussed above with relation to FIG. 1c. Reference is therefore made to this discussion of FIG. 1c and the statements made there also apply to the embodiment of the method 100 discussed here.

At this point, it should be pointed out that the connection surfaces 115 and 125 may also have a curved geometry, unlike the situation shown in FIGS. 1a-c and FIGS. 3a-c. However, the connection surfaces 115 and 125 may be shaped such that they may at least partially be joined in a form-fit manner to allow establishing a good bond between them.

Figure 4:
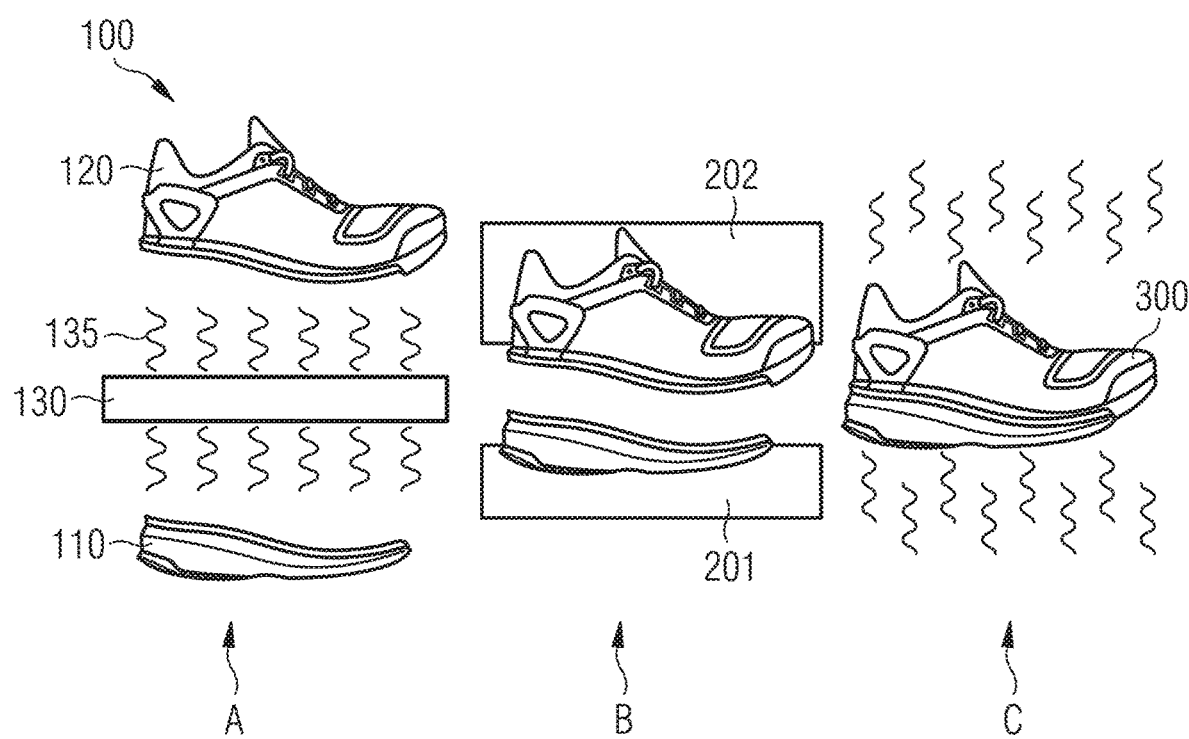
FIG. 4a-c is a further schematic representation of a manufacturing method for the manufacture of a shoe, according to certain embodiments of the present invention.

FIG. 4 illustrates an application of an embodiment of the method 100 for the manufacture of a shoe 300. The connection surfaces of a first component 110 provided as a sole unit and a second component 120 provided as a shoe upper are first activated by providing heat energy 135 in the form of IR radiation from an heat source 130 given by an IR radiation source as shown in step A. It is once again emphasized that the two connection surface need not necessarily be heated up to the same extent, as explained above in the context of the discussion of FIGS. 3a-c.

The sole can e.g. comprise randomly arranged particles of an expanded material, for example of eTPU, ePA and/or ePEBA. The shoe upper can comprise a textile material.

After moving the heat source 130 out of the gap between the sole unit and the shoe upper, they are both joined and pressed together for a certain period of time and under a certain pressure, as shown in step B. To this end, e.g. two component mountings 201 and 202 holding the first and second component 110 and 120 may be used.

Finally, the created shoe 300 is cooled down, as shown in step C, in order to ensure a durable connection between the shoe upper and the sole unit that is able to withstand the loads acting on the connection during use of the shoe 300.

For example, when measured according to DIN ISO 6133, the bonding strength may be above 15 N/cm, above 25 N/cm or above 50 N/cm.

FIGS. 5a-d schematically show an embodiment of a manufacturing device 200 and its use for performing an embodiment of the method 100. The manufacturing device 200 comprises a first component mounting 201 for receiving a first component 110. The device 200 further comprises a second component mounting 202 for receiving a second component 120.

The first and the second component mounting 201, 202 can be moved in relation to each other, i.e. they can be moved apart from one another and moved together again, as indicated by the arrow 150 in FIG. 5c. Moving together the component mountings 201 and 202 can be performed under pressure and the component mountings 201 and 202 may in particular be pressed onto one another under pressure after having been moved together, as indicated by the arrow 160 in FIG. 5d. This can help to produce a durable connection between the first component 110 and the second component 120, which is able to withstand the loads acting on it during use of the manufactured sporting goods. A suitable pressure may, for example, lie in the range 1-2 $N/mm^2$.

Furthermore, the first and/or second component mounting 201, 202 may be actively cooled in order to help to produce and solidify the connection or to accelerate this.

The manufacturing device 200 further comprises a heat source 130. The heat source 130 serves the purpose of providing heat energy 135 without contact to the respective connection surfaces 115 and 125 of the first and the second components 110, 120. The heat source 130 may be movable in relation to the first and second component mounting 201, 202 and can in particular be moved out of and back into the gap between the two component mountings 201, 202.

After activating the connection surfaces 115 and 125 of the first and second components 110, 120 by providing heat energy 135 without contact, movement (indicated by the arrow 140) of the heat source 130, for example, out of the gap between the first component mounting 201 and the second component mounting 202, may occur. Movement of the heat source 130 may occur in any feasible direction and is not restricted by a direction of the arrow 140 as shown in FIG. 5b. Subsequently, the two component mountings 201 and 202 are moved together, the movement of the components being indicated by the arrow 150 in FIG. 5c. Then, the two component mountings 201, 202 may be pressed onto one another (indicated by the arrow 160 in FIG. 5d) for a certain period of time and under certain pressure (s. above). The component mountings 201 and 202 may also be allowed to cool in this phase of production. In some instances, the component mountings may be actively cooled.

Figure 7A:
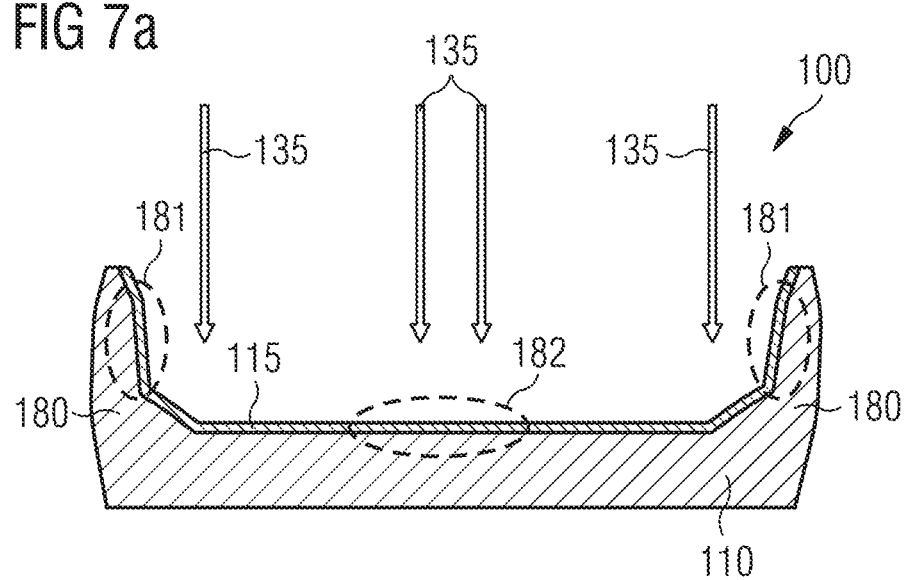

FIGS. 7a-c illustrate how the geometry of the first component 110, the first connection surface 115 and the design of the manufacturing device 200 can each influence the amount of heating of the first component 110/first connection surface 115 in different parts or regions. FIGS. 7a-c show a cross-section in the medial-to-lateral direction through a first component 110 provided as a midsole. The considerations put forth in the following may, however, also apply to first components 110 of a different kind. Further, the considerations may also apply to the second component 120/second connection surface 125.

The midsole shown in FIG. 7a comprises very steep side ramps 180 along the outer edge of the midsole. As a result, the regions 181 of the first connection surface 115 on these side ramps 180 of the midsole are arranged almost parallel to the direction of the incident heat energy 135 (e.g. IR-, radio- or microwave radiation). Therefore, the incident heat energy 135 (e.g. IR-, radio- or microwave radiation) will merely "skim" the first connection surface 115 in these regions 181 and thus the regions 181 will have less incident heat energy 135 from which they can absorb energy 135. Thus, the first connection surface 115 will only be heated to a small extent in the regions 181. In contrast, the region 182 of the first connection surface 115, located in the center of the top side of the midsoles arranged essentially perpendicular to the direction of the incident heat energy 135 and hence can absorb a much larger amount of heat energy 135 when compared to the regions 181 on the steep side ramps 180. Consequently, the first connection surface will be heated more in the region 182.

In the midsole shown in FIG. 7*b*, the medial and lateral side ramps 180 have been significantly flattened out compared to the midsole shown in FIG. 7*a*. The regions 181 of the first connection surface 115 on the side ramps 180 shown in FIG. 7*b* are now orientated in the direction of the incident heat energy 135 (i.e. the angle between the surface exposed to the heat energy 135 and the incident direction is closer to 90° when compared to the regions 181 shown in FIG. 7*a*). Thus, they are consequently heated to a larger degree than the regions 181 of FIG. 7*a* because the regions 181 of FIG. 7*b* are exposed to more of the incident heat energy 135 and, thus, can absorb more energy than the regions of 181 in FIG. 7*a*.

From these schematic illustrations the skilled person will understand that by changing the geometry of the first component 110 and its first connection surface 115, the amount of heating can be influenced. In other words, the geometry of the first component 110 may be adapted to the dimensions and requirements of a given manufacturing device 200 in order to ensure sufficient heating of the first connection surface 115 throughout and hence obtain the desired connection strength with the second component in the finished product. Conversely, by locally controlling the amount of heat energy 135 provided to different regions or parts of the first connection surface 115, such geometric effects can be accounted for.

Moreover, FIG. 7*c* shows how the manufacturing device 200 used for performing the method 100 may also have an influence and be specifically designed to control the amount of heating in different regions or the amount of heating in parts of the first component 110. For functional or visual purposes, it may, for example, be desirable that a midsole is not connected to an upper (not shown in FIG. 7*c*) along the entire length and width of the midsole, but that a small rim 111 (e.g. a rim with a width of ≈3 mm) along the outer top edge of the midsole remains unconnected. The rim 111 should therefore not be heated so that it does not inadvertently stick to the upper once the second connection surface of the upper and the first connection surface 115 of the midsole are joined. This may be achieved by covering the rim 111 by shielding elements 210 (e.g. aluminum plates) of the manufacturing device 200 before the heat energy 135 is provided such that the heat energy 135 is reflected away from the rim 111. Again, this example is to be taken only as an illustration of the more general concept of influencing the amount of heating by the design of the manufacturing device 200.

Finally, it is once again mentioned that embodiments of the method 100 and embodiments of the manufacturing device 200 may be performed and operated in an automated manner at least partly or fully. Furthermore, the embodiments may be incorporated into a larger and potentially fully automated production line, for example, such as those discussed in EP 2 862 467 A1 or EP 2 865 289 A1.

In the following, further examples are described to facilitate the understanding of the invention:

1. Method for the manufacture of sporting goods, in particular a shoe, comprising:
   a. providing a first component with a first connection surface and a second component with a second connection surface;
   b. activating at least one portion of the first connection surface by providing heat energy without contact; and
   c. connecting the first component with the second component by joining the first and the second connection surfaces.
2. Method according to the preceding example 1, wherein connecting the first component with the second component further comprises forming a bond between the at least one portion of the first connection surface and at least one portion the second connection surface.
3. Method according to the preceding example 2, wherein the bond comprises a chemical bond and/or a mechanical bond.
4. Method according to one of the preceding examples 1-3, wherein activating the first connection surface further comprises providing heat energy to the first connection surface such that an activation temperature of at least one material of the first connection surface is reached.
5. Method according to one of the preceding examples 1-4, wherein activating the first connection surface further comprises providing heat energy to the first connection surface such that a viscous layer of at least one material of the first connection surface is formed.
6. Method according to one of the preceding examples 1-5, wherein activating the first connection surface further comprises providing heat energy to the first connection surface such that the first connection surface is at least partially melted.
7. Method according to one of the preceding examples 1-6, wherein connecting the first component and the second component further comprises joining the first and second connection surfaces without an additional adhesive.
8. Method according to one of the preceding examples 1-7, wherein the first component and/or the first connection surface comprise one or more of the following materials: thermoplastic polyurethane; a polyamide such as PA4.10, PA6, PA6.6, PA6.10, PA10.10, PA11 or PA12; a polyetherblockamide; a co-polyester; a polyolefin such as a polyethylene or polypropylene; a polyolefinic elastomer such as polyisobutylene, ethylene propylene rubber or ethylene propylene diene monomer rubber; a block copolymer such as an olefin block copolymer; an expanded material such as expanded thermoplastic polyurethane, an expanded polyamide or an expanded polyetherblockamide; particles of an expanded material such as particles of expanded thermoplastic polyurethane, expanded polyamide and/or expanded polyetherblockamide.
9. Method according to one of the preceding examples 1-8, wherein the first component and/or the second component comprise one or more of the following: a sole unit, a midsole, an outsole, an outsole element, a sole plate, a film or foil material, a shoe upper, a functional element.

10. Method according to one of the preceding examples 1-9, wherein the activating is performed by irradiating with heat energy originating from at least one heat source, in particular by irradiating with infrared radiation, IR-radiation, originating from at least one IR-radiation source.

11. Method according to one of the preceding examples 1-10, further comprising activating at least one portion of the second connection surface by providing heat energy without contact and wherein the first connection surface and the second connection surface are spaced apart during their activation.

12. Method according to the preceding example 11, wherein the first connection surface and the second connection surface are simultaneously activated by heat energy emitted from a common heat source.

13. Method according to the preceding example 12, wherein the common heat source is arranged in a gap between the first and the second connection surfaces.

14. Method according to the preceding example 13, wherein prior to connecting the first component with the second component, the common heat source is removed from the gap between the first and the second connection surfaces.

15. Method according to one of the preceding examples 1-14, wherein the second component and/or the second connection surface comprise a textile material, and wherein the textile material comprises one or more of the following: a knitted construction; a woven construction; a non-woven construction; randomly deposited fibers; a multi-directional layered material; a mesh structure.

16. Method according to one of the preceding examples 1-15, wherein the second component, the second connection surface and/or the textile material comprise one or more of the following materials: polyethylene terephthalate; polybutylene terephthalate; a polyamide such as PA4.10, PA6, PA10.10, PA12, PA66, PA610, PA612 or a different grade; polyurethane; a polyolefin such as a polyethylene or polypropylene; a polyolefinic elastomer such as polyisobutylene, ethylene propylene rubber or ethylene propylene diene monomer rubber; a block copolymer such as an olefin block copolymer; thermoplastic polyurethane; a foamed or expanded material such as expanded thermoplastic polyurethane, an expanded polyamide or an expanded polyether-blockamide; a non-foamed or compact material; rubber.

17. Method according to one of the preceding examples 1-16, further comprising a solidifying of the connection of the first component and the second component.

18. Method according to the preceding example 17, wherein the solidifying is at least partially performed by cooling.

19. Method according to one of the preceding examples 2-18, wherein a bonding strength of the bond between the first and second connection surfaces is above 10 N/cm, or above 25 N/cm and in particular above 50 N/cm when measured according to DIN ISO 6133.

20. Sporting goods, in particular shoe, manufactured with a method according to one of the preceding examples 1-19.

21. Sporting goods according to the preceding example 20, comprising a first component and a second component connected to the first component without an added adhesive, wherein a bond between the first component and the second component has a bonding strength greater than 15 N/cm when measured according to DIN ISO 6133.

22. Sporting goods according to one of the preceding examples 20 or 21, wherein the sporting goods is a shoe.

23. Device for performing a method according to one of the preceding examples 1-19.

24. Device according to the preceding example 23, comprising:
　a. a first component mounting for receiving a first component and a second component mounting for receiving a second component; as well as
　b. a heat source for providing heat energy without contact, wherein
　c. the first and the second component mounting can be moved apart from one another and moved together under pressure.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for the manufacture of sporting goods, the sporting goods comprising a first component with a first connection surface and a second component with a second connection surface, the method comprising:
　positioning a heat source in a gap between the first and second connection surfaces;
　positioning a shield over a part of the first component to prevent the part of the first component from being subjected to as much heat as an unshielded portion of the first component;
　activating at least one portion of the first connection surface by providing heat energy from the heat source in the gap without contact between the heat source and the first connection surface;
　moving at least one of the heat source, the first component, or the second component so that the heat source is no longer in the gap between the first and second connection surfaces; and
　connecting the first component with the second component by joining the first and the second connection surfaces.

2. The method according to claim 1, wherein connecting the first component with the second component further comprises forming a bond between the at least one portion of the first connection surface and at least one portion of the second connection surface.

3. The method according to claim 2, wherein the bond is at least one of a chemical bond or a mechanical bond.

4. The method according to claim 1, wherein activating the first connection surface further comprises providing heat energy to the first connection surface such that an activation temperature of at least one material of the first connection surface is reached.

5. The method according to claim 1, wherein activating the first connection surface further comprises providing heat energy to the first connection surface such that a viscous layer of at least one material of the first connection surface is formed.

6. The method according to claim 1, wherein activating the first connection surface further comprises providing heat energy to the first connection surface such that the first connection surface is at least partially melted.

7. The method according to claim 1, wherein connecting the first component and the second component further comprises joining the first and second connection surfaces without an additional adhesive.

8. The method according to claim 1, wherein the sporting goods is a shoe, and wherein at least one of the first component or the second component comprise one or more of the following: a sole unit, a midsole, an outsole, an outsole element, a sole plate, a film or foil material, a shoe upper, a stabilizing element, a torsion bar, or a heel cap.

9. The method according to claim 1, wherein the activating is performed by irradiating with heat energy originating from at least one infrared radiation source.

10. The method according to claim 1, further comprising activating at least one portion of the second connection surface by providing heat energy without contact and wherein the first connection surface and the second connection surface are spaced apart during their activation.

11. The method according to claim 10, wherein the first connection surface and the second connection surface are simultaneously activated by heat energy emitted from the heat source.

12. The method according to claim 1, wherein at least one of the second component and the second connection surface comprise a textile material.

13. The method according to claim 12, wherein the textile material comprises one or more of the following: a knitted construction, a woven construction, a non-woven construction, randomly deposited fibers, a multi-directional layered material, or a mesh structure.

14. The method according to claim 1, further comprising a solidifying of the connection of the first component and the second component.

15. The method according to claim 14, wherein the solidifying is performed at least in part by cooling.

16. The method according to claim 2, wherein the bond between the at least one portion of the first connection surface and the at least one portion of the second connection surface has a bonding strength greater than 15 N/cm when measured according to DIN ISO 6133.

17. The method according to claim 1, wherein the sporting goods is a shoe.

18. The method of claim 1, wherein at least one of the activating or the connecting is performed by a device for manufacturing sporting goods, the device comprising:
a first component mounting for receiving the first component and a second component mounting for receiving the second component, wherein
the first and the second component mounting are movable apart from one another and movable together under pressure.

19. A method for the manufacture of sporting goods, the sporting goods comprising a first component with a first connection surface and a second component with a second connection surface, the method comprising:
positioning a shield over a part of the first component to prevent the part of the first component from being subjected to as much heat as an unshielded portion of the first component;
activating at least one portion of the first connection surface by providing heat energy without contact to the unshielded portion; and
connecting the first component with the second component by joining the first and the second connection surfaces.

* * * * *